(12) United States Patent
Liu et al.

(10) Patent No.: US 12,294,895 B2
(45) Date of Patent: May 6, 2025

(54) IAB NODE SWITCHING METHOD AND APPARATUS

(71) Applicant: HUAWEI TECHNOLOGIES CO., LTD., Shenzhen (CN)

(72) Inventors: Jing Liu, Shanghai (CN); Zhenzhen Cao, Beijing (CN); Mingzeng Dai, Shenzhen (CN); Yuanping Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 745 days.

(21) Appl. No.: 17/398,175

(22) Filed: Aug. 10, 2021

(65) Prior Publication Data

US 2021/0368409 A1 Nov. 25, 2021

Related U.S. Application Data

(63) Continuation of application No. PCT/CN2020/075156, filed on Feb. 13, 2020.

(30) Foreign Application Priority Data

Feb. 15, 2019 (CN) .......................... 201910118848.7

(51) Int. Cl.
*H04W 36/00* (2009.01)
*H04W 36/08* (2009.01)
*H04W 36/38* (2009.01)

(52) U.S. Cl.
CPC .... *H04W 36/0033* (2013.01); *H04W 36/0011* (2013.01); *H04W 36/08* (2013.01); *H04W 36/38* (2013.01)

(58) Field of Classification Search
CPC . H04W 36/08; H04W 36/0033; H04W 36/38; H04W 36/0011; H04W 36/00; H04W 24/10

(Continued)

(56) References Cited

U.S. PATENT DOCUMENTS

2007/0104148 A1 5/2007 Kang et al.
2020/0084819 A1* 3/2020 Abedini ................ H04W 76/15
(Continued)

FOREIGN PATENT DOCUMENTS

CN 103037456 A 4/2013
CN 103096400 A 5/2013
(Continued)

OTHER PUBLICATIONS

3GPP TR 38.874, V16.0.0, Anonymous: "3rd Generation Partnership Project; Technical Specification Group Radio Access Network; N R; Study on Integrated Access and Backhaul; (Release 16)", Jan. 10, 2019, pp. 1-111, XP051591643.
(Continued)

*Primary Examiner* — Rownak Islam
(74) *Attorney, Agent, or Firm* — Maier & Maier, PLLC

(57) ABSTRACT

An integrated access and backhaul (IAB) node switching method, including: receiving, by a third IAB node, a node switching command from a source donor node, where the node switching command is used to indicate a parent node of the third IAB node to switch to a second node, the source donor node is a control node of the third IAB node, the first node is a source parent node of the third IAB node, the first node is a donor node or another IAB node, and the second node is a donor node or another IAB node; and switching, by the third IAB node, to the second node, and sending, by the third IAB node, first indication information to a child node of the third IAB node, where the first indication information indicates the child node to interrupt transmission with the third IAB node.

14 Claims, 21 Drawing Sheets

(58) Field of Classification Search
USPC .................................................... 370/331
See application file for complete search history.

(56) References Cited

U.S. PATENT DOCUMENTS

| | | | | |
|---|---|---|---|---|
| 2021/0258847 A1* | 8/2021 | Wu | ............... | H04W 36/00837 |
| 2021/0298000 A1* | 9/2021 | Park | ............... | H04L 5/0098 |
| 2022/0007212 A1* | 1/2022 | Hwang | ............... | H04W 76/38 |

FOREIGN PATENT DOCUMENTS

| | | | | |
|---|---|---|---|---|
| CN | 107736004 A | | 2/2018 | |
| CN | 109275177 A | | 1/2019 | |
| EP | 2547137 A1 | | 1/2013 | |
| EP | 2693807 A2 | | 2/2014 | |
| WO | WO-2018054341 A1 | * | 3/2018 | ............ H04W 24/10 |
| WO | 2018119883 A1 | | 7/2018 | |
| WO | 2018175817 A1 | | 9/2018 | |

OTHER PUBLICATIONS

LG Electronics Inc., Inter-donor topology adaptation for architecture 1a. 3GPP TSG-RAN WG3 #102, Spokane, WA, USA, Nov. 12-16, 2018, R3-186751, 7 pages.

3GPP TR 38.874 0.7.0 (Nov. 2018), 3rd Generation Partnership Project; Technical Specification Group Radio Access Network; Study on Integrated Access and Backhaul; (Release 15), 111 pages.

3GPP TR 36.836 V12.0.0 (Jun. 2014), 3rd Generation Partnership Project; Technical Specification Group Radio Access Network; Evolved Universal Terrestrial Radio Access (E-UTRA); Study on mobile relay (Release 12), 36 pages.

AT&T, Route Changes Based on Intra-gNB Handover of IAB Node. 3GPP TSG-RAN WG2 Meeting #103, Gothenburg, Sweden, Aug. 20-24, 2018, R2-1812405, 4 pages.

3GPP TSG-RAN WG2 Meeting #102, R2-1808668, "Topology type, discovery and update for IAB", Huawei, HiSilicon, Busan, Korea, May 21-25, 2018; 5 pages.

3GPP TSG-RAN WG3 Meeting #100, R3-183189, "Topology type, discovery and update for IAB", Huawei, Busan, Korea, May 21-25, 2018; 5 pages.

3GPP TSG-RAN WG2 Meeting #103, R2-1811778, "IAB Topology and Routing Management", vivo, Gothenburg, Sweden, Aug. 20-24, 2018; 4 pages.

3GPP TSG-RAN WG2 NR AdHoc 1807, R2-1810211, "Discussion on IAB topology adaptation", ZTE, Montreal, Canada, Jul. 2-6, 2018; 4 pages.

* cited by examiner

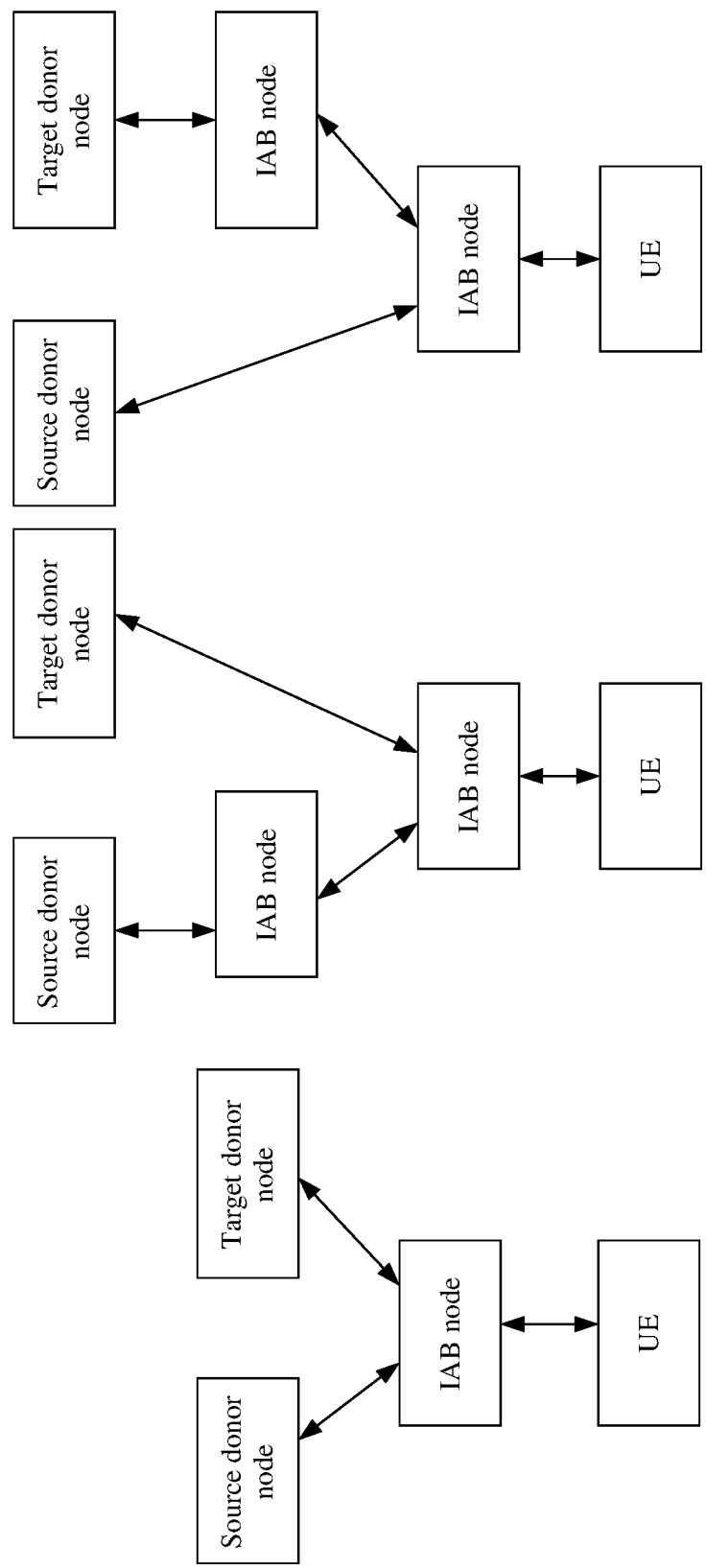

IAB NODE SWITCHING METHOD AND APPARATUS

CROSS-REFERENCE TO RELATED APPLICATIONS

This application is a continuation of International Application No. PCT/CN2020/075156, filed on Feb. 13, 2020, which claims priority to Chinese Patent Application No. 201910118848.7, filed on Feb. 15, 2019. The aforementioned disclosures are hereby incorporated by reference in their entities.

TECHNICAL FIELD

Embodiments relate to the field of communications technologies, and in particular, to an integrated access and backhaul (IAB) node switching method and apparatus.

BACKGROUND

As an intermediate node, a relay node (RN) may forward a signal sent by a donor base station (e.g. donor eNB) to user equipment (UE).

A mobile relay (that is, the relay node moves) is introduced in a long term evolution (LTE) system. When the relay node moves, a parent node (for example, the donor base station) of the relay node may change, or when an original link fails due to network congestion or the like, a parent node of the relay node is triggered to change. This phenomenon is referred to as relay switching. For example, it is assumed that a packet data gateway (PGW)/service gateway (SGW) that provides a server for the relay node is located outside the donor base station. As shown in FIG. 1, a communications system includes a donor base station 10, a donor base station 11, a PGW/SGW 12, a relay node 13, and UE 14. When the relay node 13 does not move, a parent node of the relay node 13 is the donor base station 10. In addition, the PGW/SGW 12 transmits a signal to the donor base station 10 through an S1-U interface between the PGW/SGW 12 and the donor base station 10, the donor base station 10 transmits the signal to the relay node 13 through an Un interface between the donor base station 10 and the relay node 13, and finally, the relay node 13 transmits the signal to the UE 14 through a Uu interface between the relay node 13 and the UE 14. When the relay node 13 moves, a parent node of the relay node 13 switches from the donor base station 10 to the donor base station 11. In this case, the donor base station 11 triggers S1-U interface switching. Specifically, an S1-U interface between the PGW/SGW 12 and the donor base station 10 switches to an S1-U interface between the PGW/SGW 12 and the donor base station 11.

However, when an integrated access and backhaul (IAB) technology is introduced in a fifth generation mobile communications system (also referred to as a new radio (NR) system), there is no solution to problems related to IAB node (also referred to as a relay node in an LTE system) switching.

SUMMARY

Embodiments provide an IAB node switching method and apparatus, so as to implement smooth IAB node switching.

To achieve the foregoing objective, the following solutions are used in the embodiments:

According to a first aspect, an embodiment provides an IAB node switching method, and the method includes: a third IAB node receives a node switching command from a source donor node, where the node switching command is used to indicate a parent node of the third IAB node to switch to a second node, the source donor node is a control node of the third IAB node, the first node is a source parent node of the third IAB node, the first node is a donor node or another IAB node, and the second node is a donor node or another IAB node; and the third IAB node switches to the second node, and the third IAB node sends first indication information to a child node of the third IAB node, where the first indication information indicates the child node of the third IAB node to interrupt transmission with the third IAB node.

It may be understood that in this embodiment, a two-hop IAB backhaul link is used as an example to describe the IAB node switching method. A to-be-switched IAB node is referred to as the third IAB node, the parent node of the third IAB node before switching is the first node, and the parent node of the third IAB node after switching is the second node. For example, if the first node is an IAB node, the second node is also an IAB node, that is, the parent node of the third IAB node before switching is referred to as a first IAB node, and the parent node of the third IAB node after switching is referred to as a second IAB node. Before switching, a first-hop backhaul link is a link between the donor node and the first IAB node, and a second-hop backhaul link is a link between the first IAB node and the third IAB node. After switching, the first-hop backhaul link is a link between the donor node and the second IAB node, and the second-hop backhaul link is a link between the second IAB node and the third IAB node. In this embodiment, the IAB node switching refers to switching of the parent node of the third IAB node between the first IAB node and the second IAB node.

In this embodiment, the third IAB node may send a measurement report to the source donor node by using an RRC message. The measurement report includes an indicator that reflects channel quality between the third IAB node and the parent node of the third IAB node. When the source donor node determines, based on the measurement report reported by the third IAB node, that the channel quality between the third IAB node and the parent node of the third IAB node is relatively poor, the source donor node determines that IAB node switching needs to be performed, that is, determines that the parent node of the third IAB node needs to switch from a current node (for example, the first node) to another node (for example, the second node), to ensure the channel quality of the third IAB node.

In this embodiment, target transmission time unit configuration information of the link between the second node and the third IAB node may include uplink transmission time unit configuration information used by the third IAB node to send information to the second node and downlink transmission time unit configuration information used by the second node to send information (the information may be user plane data, or may be control plane signaling) to the third IAB node. Target transmission time unit configuration information of a link between the third IAB node and the child node of the third IAB node may include uplink transmission time unit configuration information used by the child node of the third IAB node to send information to the third IAB node and downlink transmission time unit configuration information used by the third IAB node to send information to the child node of the third IAB node.

Optionally, the target transmission time unit configuration information of the third IAB node may further include other transmission time unit configuration information, and the other transmission time unit configuration information may be used for link communication between the second node and the third IAB node, or may be used for link communication between the third IAB node and the child node of the third IAB node. However, a transmission time unit can be used only for one type of link communication at a same moment.

In a possible implementation, that the first indication information indicates the child node of the third IAB node to interrupt transmission with the third IAB node may include: The first indication information indicates the child node of the third IAB node to perform one or a combination of the following operations: suspending a PUCCH resource between the third IAB node and the child node of the third IAB node, suspending a PRACH resource between the third IAB node and the child node of the third IAB node, stopping an uplink synchronous timer, stopping a timer related to an SR, stopping a timer related to a BSR, stopping a timer related to RLC retransmission, stopping a timer related to RLC data reassembly, stopping a timer related to an RLC status report, stopping a PDCP packet loss timer, stopping a PDCP layer reordering timer, stopping RRM measurement between the third IAB node and the child node of the third IAB node, stopping reading a system broadcast message, and stopping data transmission with the third IAB node.

For example, the suspending the PUCCH resource may include that the child node (for example, UE) of the third IAB node stops sending HARQ feedback on downlink data on the PUCCH resource or stops sending a periodic SR on the PUCCH resource. The suspending the PRACH resource may include that the child node of the third IAB node stops sending a preamblesequence on the PRACH resource, and the like. The stopping the RRM measurement between the third IAB node and the child node means that the child node of the third IAB node no longer performs measurement or reports a measurement result. The stopping the data transmission with the third IAB node may include that the child node of the third IAB node no longer receives a PDSCH or sends a PUSCH. The timer related to an SR may include sr-ProhibitTimer. The timer related to a BSR includes periodicB SR-Timer. The timer related to RLC retransmission includes t-PollRetransmit. The timer related to RLC data reassembly includes t-Reassembly. The timer related to an RLC status report includes t-StatusProhibit. The PDCP packet loss timer includes discardTimer. The PDCP layer reordering timer includes t-Reordering.

In this embodiment, the first indication information may be explicit indication information, or may be implicit indication information. This is not limited in the embodiments. When the child node of the third IAB node receives the first indication information, the child node of the third IAB node interrupts transmission with the third IAB. Optionally, the first indication information may be carried in an RRC message, an F1AP message, PDCCH DCI, or a MAC CE. In this way, the child node of the third IAB node may obtain the first indication information from the RRC message, the F1AP message, the PDCCH DCI, or the MAC CE, and further interrupt transmission with the third IAB.

In a possible implementation, the IAB node switching method provided in this embodiment may further include: the third IAB node performs one or a combination of the following operations: stopping sending data to the child node of the third IAB node, stopping receiving data from the child node of the third IAB node, stopping broadcasting a system message, and stopping sending a reference signal.

Correspondingly, after the third IAB node sends the first indication information to the child node of the third IAB node, the third IAB node returns to a UE mode, for example, suspends a DU of the third IAB node, and performs one or a combination of the foregoing operations.

It may be understood that the child node of the third IAB node may be UE, or the third IAB node may be another IAB node. This is not limited in the embodiments.

In a possible implementation, the node switching command includes target transmission time unit configuration information of the third IAB node, and the target transmission time unit configuration information includes at least one of the following: target transmission time unit configuration information of a link between the second node and the third IAB node, target transmission time unit configuration information of a link between the third IAB node and the child node of the third IAB node, or target transmission time unit configuration information of a link between the second node and the third IAB node and target transmission time unit configuration information of a link between the third IAB node and the child node of the third IAB node.

In a possible implementation, the method for switching the third IAB node to the second node may include: The third IAB node initiates random access to the second node, where a transmission time unit used by the third IAB node to initiate random access is one or more transmission time units included in the target transmission time unit configuration information of the link between the second node and the third IAB node.

In this embodiment, the random access initiated by the third IAB node to the second node may be contention-free random access, and a contention-free random access process of the third IAB node may include: The third IAB node sends a random access preamble sequence to the second node, and the third IAB node receives a random access response sent by the second node. Further, after the third IAB node accesses the second node, the third IAB node sends an RRC reconfiguration complete message to the source donor node, to notify the source donor node that the random access of the third IAB node succeeds.

In a possible implementation, the IAB node switching method provided in this embodiment may further include: the third IAB node sends second indication information to the child node of the third IAB node after the third IAB node successfully accesses the second node, where the second indication information indicates the child node of the third IAB node to resume transmission with the third IAB node.

In a possible implementation, that the second indication information indicates the child node of the third IAB node to resume transmission with the third IAB node may include: the second indication information indicates the child node of the third IAB node to perform one or a combination of the following operations: resuming the PUCCH resource between the third IAB node and the child node of the third IAB node, resuming the PRACH resource between the third IAB node and the child node of the third IAB node, resuming the uplink synchronous timer, resuming the timer related to an SR, resuming the timer related to a BSR, resuming the timer related to RLC retransmission, resuming the timer related to RLC data reassembly, resuming the timer related to an RLC status report, resuming the PDCP packet loss timer, resuming the PDCP layer reordering timer, resuming the RRM measurement between the third IAB node and the child node of the third IAB node, resuming reading the system broadcast message, and resuming the data transmission with the third IAB node.

Similar to the first indication information, the second indication information may be explicit indication information, or may be implicit indication information. This is not limited in the embodiments. When the child node of the third IAB node receives the second indication information, the child node of the third IAB node resumes transmission with the third IAB. Optionally, the second indication information may be carried in an RRC message, an F1AP message, PDCCH DCI, or a MAC CE. In this way, the child node of the third IAB node may obtain the second indication information from the RRC message, the F1AP message, the PDCCH DCI, or the MAC CE, and further resume transmission with the third IAB.

It may be understood that, in this embodiment, the first indication information sent by the third IAB node indicates resources that are suspended or operations that are stopped by the child node of the third IAB node, and after the third IAB node successfully accesses the second node, the second indication information sent by the third IAB node indicates the child node of the third IAB node to resume corresponding resources or operations. The operation of resuming the timer may be resetting the timer (the timer starts counting from zero), or continuing counting from an original count value. This is not limited in the embodiments.

The resuming the PUCCH resource means that the child node of the third IAB node starts to use the PUCCH resource, and the PUCCH resource may be a source PUCCH resource (that is, the PUCCH resource does not change, and in this case, the child node of the third IAB node continues to use the originally configured PUCCH resource). The PUCCH resource may alternatively be a newly configured PUCCH resource. After obtaining the newly configured PUCCH resource, the child node of the third IAB node starts to use the newly configured PUCCH resource.

In this embodiment, the third IAB node may carry the first indication information and/or the second indication information in an RRC message, an F1AP message, a MAC CE, or PDCCH DCI, and send the first indication information and/or the second indication information to the child node of the third IAB node. This is not limited in the embodiments.

According to a second aspect, an embodiment provides an IAB node switching method, and the method may include: a target donor node receives a switching request message sent by a source donor node, where the switching request message is used to indicate to switch a parent node of a third IAB node to a second node, and the switching request message carries at least one piece of the following information: source transmission time unit configuration information of the third IAB node or IAB node indication information; and the target donor node sends a switching response message to the source donor node, where the source transmission time unit configuration information includes at least one piece of the following information: source transmission time unit configuration information of a link between a first node and the third IAB node, source transmission time unit configuration information of a link between the third IAB node and a child node of the third IAB node, or source transmission time unit configuration information of a link between a first node and the third IAB node and source transmission time unit configuration information of a link between the third IAB node and a child node of the third IAB node, where the IAB node indication information is used to indicate that a to-be-switched node is an IAB node, the first node is a source parent node of the third IAB node, the first node is the source donor node or another IAB node, and the second node is the target donor node or another IAB node.

In this embodiment, the source transmission time unit configuration information of the link between the first node and the third IAB node may include uplink transmission time unit configuration information used by the third IAB node to send information (the information may be user plane data, or may be control plane signaling) to the first node and downlink transmission time unit configuration information used by the first node to send information to the third IAB node. The source transmission time unit configuration information of the link between the third IAB node and the child node of the third IAB node may include uplink transmission time unit configuration information used by the child node of the third IAB node to send information to the third IAB node and downlink transmission time unit configuration information used by the third IAB node to send information to the child node of the third IAB node.

Optionally, the source transmission time unit configuration information of the third IAB node may further include other transmission time unit configuration information, and the other transmission time unit configuration information may be used for link communication between the first node and the third IAB node, or may be used for link communication between the third IAB node and the child node of the third IAB node. However, a transmission time unit can be used only for one type of link communication at a same moment.

In a possible implementation, the switching response message includes target transmission time unit configuration information of the third IAB node, and the target transmission time unit configuration information includes at least one piece of the following information: target transmission time unit configuration information of a link between the second node and the third IAB node, target transmission time unit configuration information of the link between the third IAB node and the child node of the third IAB node, or target transmission time unit configuration information of a link between the second node and the third IAB node and target transmission time unit configuration information of the link between the third IAB node and the child node of the third IAB node.

In a possible implementation, the IAB node switching method provided in this embodiment may further include: the target donor node generates the target transmission time unit configuration information.

In this embodiment, the target donor node may generate the target transmission time unit configuration information based on the source transmission time unit configuration information received from the source donor node. Alternatively, the target donor node may directly generate new transmission time unit configuration information (that is, the target transmission time unit configuration information) without considering the source transmission time unit configuration information. The new transmission time unit configuration information may be completely different from or partially different from the source transmission time unit configuration information.

That the target donor node generates the target transmission time unit configuration information based on the source transmission time unit configuration information includes: The second node may use the source transmission time unit configuration information of the link between the third IAB node and the child node of the third IAB node as the target transmission time unit configuration information of the link between the third IAB node and the child node of the third IAB node; or the target transmission time unit configuration information of the link between the third IAB node and the child node of the third IAB node may include the source transmission time unit configuration information of the link between the third IAB node and the child node of the third IAB node; or the target transmission time unit configuration information of the link between the third IAB node and the child node of the third IAB node may be a subset of the source transmission time unit configuration information of the link between the third IAB node and the child node of the third IAB node. Therefore, communication between the third IAB node and the child node of the third IAB node is not affected.

In a possible implementation, when the second node is an IAB node, the IAB node switching method provided in this embodiment may further include: the target donor node sends the target transmission time unit configuration information to the second node.

In this embodiment, the target donor node may carry the target transmission time unit configuration information in a UE context setup request message and send the UE context setup request message to the second node. For example, the UE context setup request message may be an F1AP message.

Optionally, the target donor node may alternatively carry the target transmission time unit configuration information in an RRC message and send the RRC message to the second node.

In a possible implementation, when the second node is an IAB node, the IAB node switching method provided in this embodiment may further include: the target donor node sends at least one piece of the following information to the second node: the source transmission time unit configuration information of the third IAB node or the IAB node indication information, where the source transmission time unit configuration information includes at least one piece of the following information: the source transmission time unit configuration information of the link between the first node and the third IAB node, the source transmission time unit configuration information of the link between the third IAB node and the child node of the third IAB node, or the source transmission time unit configuration information of the link between the first node and the third IAB node and the source transmission time unit configuration information of the link between the third IAB node and the child node of the third IAB node; and the target donor node receives, from the second node, target transmission time unit configuration information generated by the second node.

According to a third aspect, an embodiment provides an IAB node switching method, and the method may include: a second IAB node receives at least one piece of the following information from a target donor node: source transmission time unit configuration information of a third IAB node or IAB node indication information; and the second IAB node generates target transmission time unit configuration information, and the second IAB node sends the target transmission time unit configuration information to the target donor node. The source transmission time unit configuration information of the third IAB node includes at least one piece of the following information: source transmission time unit configuration information of a link between a first node and the third IAB node, source transmission time unit configuration information of a link between the third IAB node and a child node of the third IAB node, or source transmission time unit configuration information of a link between a first node and the third IAB node and source transmission time unit configuration information of a link between the third IAB node and a child node of the third IAB node. The target donor node is a control node of the second IAB node, and the IAB node indication information is used to indicate that a to-be-switched node is an IAB node, and the target transmission time unit configuration information includes at least one piece of the following information: target transmission time unit configuration information of a link between the second IAB node and the third IAB node, target transmission time unit configuration information of the link between the third IAB node and the child node of the third IAB node, or target transmission time unit configuration information of a link between the second IAB node and the third IAB node and target transmission time unit configuration information of the link between the third IAB node and the child node of the third IAB node, where the first node is a donor node or an IAB node.

In this embodiment, the second IAB node may generate the target transmission time unit configuration information based on the source transmission time unit configuration information received from the target donor node. Alternatively, the second IAB node may directly generate new transmission time unit configuration information (that is, the target transmission time unit configuration information) without considering the source transmission time unit configuration information. The new transmission time unit configuration information may be completely different from or partially different from the source transmission time unit configuration information.

Optionally, that the second IAB node generates the target transmission time unit configuration information based on the source transmission time unit configuration information includes: the second IAB node may use the source transmission time unit configuration information of the link between the third IAB node and the child node of the third IAB node as the target transmission time unit configuration information of the link between the third IAB node and the child node of the third IAB node; or the target transmission time unit configuration information of the link between the third IAB node and the child node of the third IAB node may include the source transmission time unit configuration information of the link between the third IAB node and the child node of the third IAB node; or the target transmission time unit configuration information of the link between the third IAB node and the child node of the third IAB node may be a subset of the source transmission time unit configuration information of the link between the third IAB node and the child node of the third IAB node. Therefore, communication between the third IAB node and the child node of the third IAB node is not affected.

In a possible implementation, the first node is an IAB node, a control node of the first node is the source donor node, the control node of the second IAB node is the target donor node, and the target donor node is the same as or different from the source donor node. When the target donor node is the same as the source donor node, the second IAB node receives at least one of the source transmission time unit configuration information of the third IAB node or the IAB node indication information from the source donor node, and the second IAB node sends the target transmission time unit configuration information to the source donor node after the second IAB node generates the target transmission time unit configuration information.

In a possible implementation, when the target donor node is the same as the source donor node, if the target transmission time unit configuration information is generated by the source donor node, the IAB node switching method provided in this embodiment may further include: The second IAB node receives the target transmission time unit configuration information from the source donor node.

In a possible implementation, when the target donor node is different from the source donor node, if the target transmission time unit configuration information is generated by the target donor node, the IAB node switching method provided in this embodiment may further include: The second IAB node receives the target transmission time unit configuration information from the target donor node.

According to a fourth aspect, an embodiment provides an IAB node switching method, and the method may include: a source donor node sends a switching request message to a target donor node, where the switching request message is used to indicate to switch a parent node of a third IAB node to a second node, and the switching request message carries at least one piece of the following information: source transmission time unit configuration information of the third IAB node or IAB node indication information; and the source donor node receives a switching response message from the target donor node, where the switching response message includes target transmission time unit configuration information of the third IAB node. The source transmission time unit configuration information of the third IAB node includes at least one piece of the following information: source transmission time unit configuration information of a link between a first node and the third IAB node, source transmission time unit configuration information of a link between the third IAB node and a child node of the third IAB node, or source transmission time unit configuration information of a link between a first node and the third IAB node and source transmission time unit configuration information of a link between the third IAB node and a child node of the third IAB node. The IAB node indication information is used to indicate that a to-be-switched node is an IAB node, the first node is a source parent node of the third IAB node, the first node is the source donor node or another IAB node, and the second node is the target donor node or another IAB node. The target transmission time unit configuration information of the third IAB node includes at least one piece of the following information: target transmission time unit configuration information of a link between the second node and the third IAB node, target transmission time unit configuration information of the link between the third IAB node and the child node of the third IAB node, or target transmission time unit configuration information of a link between the second node and the third IAB node and target transmission time unit configuration information of the link between the third IAB node and the child node of the third IAB node.

In a possible implementation, the target transmission time unit configuration information is generated by the target donor node.

In a possible implementation, the target transmission time unit configuration information is generated by the second node.

For descriptions of related content of the possible implementations of the third aspect and the possible implementations of the fourth aspect, refer to descriptions of related content of the possible implementations of the first aspect and the possible implementations of the second aspect. Details are not described herein again.

With reference to the first aspect to the fourth aspect, according to the IAB node switching method provided in the embodiments, in a process in which the parent node of the third IAB node switches from the first node to the second node, the source donor node, the target donor node, or the second node may generate the target transmission time unit configuration information of the third IAB node, and the third IAB node may send the first indication information to the child node of the third IAB node, to indicate the child node of the third IAB node to interrupt transmission with the third IAB node, so that the parent node of the third IAB node successfully completes switching.

According to a fifth aspect, an embodiment provides an IAB node, where the IAB node is a third IAB node, and the IAB node includes a receiving module and a sending module. The receiving module is configured to receive a node switching command from a source donor node, where the node switching command is used to indicate a parent node of the third IAB node to switch to a second node, the source donor node is a control node of the third IAB node, a first node is a source parent node of the third IAB node, the first node is a donor node or another IAB node, and the second node is a donor node or another IAB node; and the sending module is configured to switch to the second node, and send first indication information to a child node of the third IAB node, where the first indication information indicates the child node of the third IAB node to interrupt transmission with the third IAB node.

In a possible implementation, that the first indication information indicates the child node to interrupt transmission with the third IAB node may include: the first indication information indicates the child node to perform one or a combination of the following operations: suspending a PUCCH resource between the third IAB node and the child node of the third IAB node, suspending a PRACH resource between the third IAB node and the child node of the third IAB node, stopping an uplink synchronous timer, stopping a timer related to an SR, stopping a timer related to a BSR, stopping a timer related to RLC retransmission, stopping a timer related to RLC data reassembly, stopping a timer related to an RLC status report, stopping a PDCP packet loss timer, stopping a PDCP layer reordering timer, stopping RRM measurement between the third IAB node and the child node of the third IAB node, stopping reading a system broadcast message, and stopping data transmission with the third IAB node.

In a possible implementation, the sending module and the receiving module constitute a communications module. The communications module is configured to perform one or a combination of the following operations: stopping sending data to the child node of the third IAB node, stopping receiving data from the child node of the third IAB node, stopping broadcasting a system message, and stopping sending a reference signal.

In a possible implementation, the node switching command includes target transmission time unit configuration information of the third IAB node, and the target transmission time unit configuration information includes at least one of the following: target transmission time unit configuration information of a link between the second node and the third IAB node, target transmission time unit configuration information of a link between the third IAB node and the child node of the third IAB node, or target transmission time unit configuration information of a link between the second node and the third IAB node and target transmission time unit configuration information of a link between the third IAB node and the child node of the third IAB node.

In a possible implementation, the sending module is configured to initiate random access to the second node, where a transmission time unit used by the third IAB node to initiate random access is one or more transmission time units included in the target transmission time unit configuration information of the link between the second node and the third IAB node.

In a possible implementation, the sending module is further configured to send second indication information to the child node of the third IAB node after the third IAB node successfully accesses the second node, where the second indication information indicates the child node of the third IAB node to resume transmission with the third IAB node.

In a possible implementation, that the second indication information indicates the child node of the third IAB node to resume transmission with the third IAB node may include: the second indication information indicates the child node of the third IAB node to perform one or a combination of the following operations: resuming the PUCCH resource between the third IAB node and the child node of the third IAB node, resuming the PRACH resource between the third IAB node and the child node of the third IAB node, resuming the uplink synchronous timer, resuming the timer related to an SR, resuming the timer related to a BSR, resuming the timer related to RLC retransmission, resuming the timer related to RLC data reassembly, resuming the timer related to an RLC status report, resuming the PDCP packet loss timer, resuming the PDCP layer reordering timer, resuming the RRM measurement between the third IAB node and the child node of the third IAB node, resuming reading the system broadcast message, and resuming the data transmission with the third IAB node.

According to a sixth aspect, an embodiment provides a target donor node, including a receiving module and a sending module. The receiving module is configured to receive a switching request message sent by a source donor node, where the switching request message is used to indicate to switch a parent node of a third IAB node to a second node, and the switching request message carries at least one piece of the following information: source transmission time unit configuration information of the third IAB node or IAB node indication information, where the source transmission time unit configuration information includes at least one piece of the following information: source transmission time unit configuration information of a link between a first node and the third IAB node, source transmission time unit configuration information of a link between the third IAB node and a child node of the third IAB node, or source transmission time unit configuration information of a link between a first node and the third IAB node and source transmission time unit configuration information of a link between the third IAB node and a child node of the third IAB node. The IAB node indication information is used to indicate that a to-be-switched node is an IAB node, the first node is a source parent node of the third IAB node, the first node is the source donor node or another IAB node, and the second node is the target donor node or another IAB node; and the sending module is configured to send a switching response message to the source donor node.

In a possible implementation, the switching response message includes target transmission time unit configuration information of the third IAB node, and the target transmission time unit configuration information includes at least one piece of the following information: target transmission time unit configuration information of a link between the second node and the third IAB node, target transmission time unit configuration information of the link between the third IAB node and the child node of the third IAB node, or target transmission time unit configuration information of a link between the second node and the third IAB node and target transmission time unit configuration information of the link between the third IAB node and the child node of the third IAB node.

In a possible implementation, the target donor node provided in this embodiment further includes a generation module, and the generation module is configured to generate the target transmission time unit configuration information.

In a possible implementation, when the second node is an IAB node, the sending module is further configured to send the target transmission time unit configuration information to the second node.

In a possible implementation, when the second node is an IAB node, the sending module is further configured to send at least one piece of the following information to the second node: the source transmission time unit configuration information of the third IAB node or the IAB node indication information, where the source transmission time unit configuration information includes at least one piece of the following information: the source transmission time unit configuration information of the link between the first node and the third IAB node, the source transmission time unit configuration information of the link between the third IAB node and the child node of the third IAB node, or the source transmission time unit configuration information of the link between the first node and the third IAB node and the source transmission time unit configuration information of the link between the third IAB node and the child node of the third IAB node; and the receiving module is further configured to receive, from the second node, target transmission time unit configuration information generated by the second node.

According to a seventh aspect, an embodiment provides an IAB node. The IAB node is a second IAB node, and the second IAB node includes a receiving module, a generation module, and a sending module. The receiving module is configured to receive at least one piece of the following information from a target donor node: source transmission time unit configuration information of a third IAB node or IAB node indication information. The source transmission time unit configuration information of the third IAB node includes at least one piece of the following information: source transmission time unit configuration information of a link between a first node and the third IAB node, source transmission time unit configuration information of a link between the third IAB node and a child node of the third IAB node, or source transmission time unit configuration information of a link between a first node and the third IAB node and source transmission time unit configuration information of a link between the third IAB node and a child node of the third IAB node. The target donor node is a control node of the second IAB node, and the IAB node indication information is used to indicate that a to-be-switched node is an IAB node. The generation module is configured to generate target transmission time unit configuration information, and the target transmission time unit configuration information includes at least one piece of the following information: target transmission time unit configuration information of a link between the second IAB node and the third IAB node, target transmission time unit configuration information of the link between the third IAB node and the child node of the third IAB node, or target transmission time unit configuration information of a link between the second IAB node and the third IAB node and target transmission time unit configuration information of the link between the third IAB node and the child node of the third IAB node. The sending module is configured to send the target transmission time unit configuration information to the target donor node, and the first node is a donor node or an IAB node.

In a possible implementation, the first node is an IAB node, a control node of the first node is the source donor node, the control node of the second IAB node is the target donor node, and the target donor node is the same as or different from the source donor node. When the target donor node is the same as the source donor node, the receiving module is further configured to receive at least one of the source transmission time unit configuration information of the third IAB node or the IAB node indication information from the source donor node, and the sending module is further configured to send the target transmission time unit configuration information to the source donor node after the second IAB node generates the target transmission time unit configuration information.

In a possible implementation, when the target donor node is the same as the source donor node, if the target transmission time unit configuration information is generated by the source donor node, the receiving module is further configured to receive the target transmission time unit configuration information from the source donor node.

In a possible implementation, when the target donor node is different from the source donor node, if the target transmission time unit configuration information is generated by the target donor node, the receiving module is further configured to receive the target transmission time unit configuration information from the target donor node.

According to an eighth aspect, an embodiment provides a source donor node, including a sending module and a receiving module. The sending module is configured to send a switching request message to a target donor node, where the switching request message is used to indicate to switch a parent node of a third IAB node to a second node, and the switching request message carries at least one piece of the following information: source transmission time unit configuration information of the third IAB node or IAB node indication information. The source transmission time unit configuration information of the third IAB node includes at least one piece of the following information: source transmission time unit configuration information of a link between a first node and the third IAB node, source transmission time unit configuration information of a link between the third IAB node and a child node of the third IAB node, or source transmission time unit configuration information of a link between a first node and the third IAB node and source transmission time unit configuration information of a link between the third IAB node and a child node of the third IAB node. The IAB node indication information is used to indicate that a to-be-switched node is an IAB node, the first node is a source parent node of the third IAB node, the first node is the source donor node or another IAB node, and the second node is the target donor node or another IAB node. The receiving module is configured to receive a switching response message from the target donor node, where the switching response message includes target transmission time unit configuration information of the third IAB node. The target transmission time unit configuration information of the third IAB node includes at least one piece of the following information: target transmission time unit configuration information of a link between the second node and the third IAB node, target transmission time unit configuration information of the link between the third IAB node and the child node of the third IAB node, or target transmission time unit configuration information of a link between the second node and the third IAB node and target transmission time unit configuration information of the link between the third IAB node and the child node of the third IAB node.

In a possible implementation, the target transmission time unit configuration information is generated by the target donor node.

In a possible implementation, the target transmission time unit configuration information is generated by the second node.

According to a ninth aspect, an embodiment provides an IAB node. The IAB node is a third IAB node, and the third IAB node includes a processor and a memory coupled to the processor. The memory is configured to store computer instructions. When the third IAB node is run, the processor executes the computer instructions stored in the memory, so that the third IAB node performs the IAB node switching method according to any one of the first aspect and the possible implementations of the first aspect.

According to a tenth aspect, an embodiment provides a computer-readable storage medium. The computer-readable storage medium may include computer instructions. When the computer instructions are run on a computer, a third IAB node is enabled to perform the IAB node switching method according to any one of the first aspect and the possible implementations of the first aspect.

According to an eleventh aspect, an embodiment provides a computer program product including computer instructions. When the computer program product is run on a computer, a third IAB node is enabled to perform the IAB node switching method according to any one of the first aspect and the possible implementations of the first aspect.

According to a twelfth aspect, an embodiment provides an IAB node, and the IAB node is a third IAB node. The third IAB node exists in a product form of a chip, and a structure of the third IAB node includes a processor and a memory. The memory is configured to be coupled to the processor, and the memory may be configured to store computer instructions. The processor is configured to execute the computer instructions stored in the memory, so that the third IAB node performs the IAB node switching method according to any one of the first aspect and the possible implementations of the first aspect.

According to a thirteenth aspect, an embodiment provides a target donor node, including a processor and a memory coupled to the processor. The memory is configured to store computer instructions. When the target donor node is run, the processor executes the computer instructions stored in the memory, so that the target donor node performs the IAB node switching method according to any one of the second aspect and the possible implementations of the second aspect.

According to a fourteenth aspect, an embodiment provides a computer-readable storage medium. The computer-readable storage medium may include computer instructions. When the computer instructions are run on a computer, a target donor node is enabled to perform the IAB node switching method according to any one of the second aspect and the possible implementations of the second aspect.

According to a fifteenth aspect, an embodiment provides a computer program product including computer instructions. When the computer program product is run on a computer, a target donor node is enabled to perform the IAB node switching method according to any one of the second aspect and the possible implementations of the second aspect.

According to a sixteenth aspect, an embodiment provides a target donor node. The target donor node exists in a product form of a chip, and a structure of the target donor node includes a processor and a memory. The memory is configured to be coupled to the processor, and the memory may be configured to store computer instructions. The processor is configured to execute the computer instructions stored in the memory, so that the target donor node performs the IAB node switching method according to any one of the second aspect and the possible implementations of the second aspect.

According to a seventeenth aspect, an embodiment provides an IAB node. The IAB node is a second IAB node, and the second IAB node includes a processor and a memory coupled to the processor. The memory is configured to store computer instructions. When the second IAB node is run, the processor executes the computer instructions stored in the memory, so that the second IAB node performs the IAB node switching method according to any one of the third aspect and the possible implementations of the third aspect.

According to an eighteenth aspect, an embodiment provides a computer-readable storage medium. The computer-readable storage medium may include computer instructions. When the computer instructions are run on a computer, the second IAB node is enabled to perform the IAB node switching method according to any one of the third aspect and the possible implementations of the third aspect.

According to a nineteenth aspect, an embodiment provides a computer program product including computer instructions. When the computer program product is run on a computer, a second IAB node is enabled to perform the IAB node switching method according to any one of the third aspect and the possible implementations of the third aspect.

According to a twentieth aspect, an embodiment provides an IAB node. The IAB node is a second IAB node, the second IAB node exists in a product form of a chip, and a structure of the second IAB node includes a processor and a memory. The memory is configured to be coupled to the processor, and the memory may be configured to store computer instructions. The processor is configured to execute the computer instructions stored in the memory, so that the second IAB node performs the IAB node switching method according to any one of the third aspect and the possible implementations of the third aspect.

According to a twenty-first aspect, an embodiment provides a source donor node, including a processor and a memory coupled to the processor. The memory is configured to store computer instructions. When the source donor node is run, the processor executes the computer instructions stored in the memory, so that the source donor node performs the IAB node switching method according to any one of the fourth aspect and the possible implementations of the fourth aspect.

According to a twenty-second aspect, an embodiment provides a computer-readable storage medium. The computer-readable storage medium may include computer instructions. When the computer instructions are run on a computer, a source donor node is enabled to perform the IAB node switching method according to any one of the fourth aspect and the possible implementations of the fourth aspect.

According to a twenty-third aspect, an embodiment provides a computer program product including computer instructions. When the computer program product is run on a computer, a source donor node is enabled to perform the IAB node switching method according to any one of the fourth aspect and the possible implementations of the fourth aspect.

According to a twenty-fourth aspect, an embodiment provides a source donor node. The source donor node exists in a product form of a chip, and a structure of the source donor node includes a processor and a memory. The memory is configured to be coupled to the processor, and the memory may be configured to store computer instructions. The processor is configured to execute the computer instructions stored in the memory, so that the source donor node performs the IAB node switching method according to any one of the fourth aspect and the possible implementations of the fourth aspect.

According to a twenty-fifth aspect, an embodiment provides a communications system. The communications system includes the third IAB node according to any one of the fifth aspect and the possible implementations of the fifth aspect, the target donor node according to any one of the sixth aspect and the possible implementations of the sixth aspect, the second IAB node according to any one of the seventh aspect and the possible implementations of the seventh aspect, and the source donor node according to any one of the eighth aspect and the possible implementations of the eighth aspect. Alternatively, the communications system includes the third IAB node according to the ninth aspect, the target donor node according to the thirteenth aspect, the second IAB node according to the seventeenth aspect, and the source donor node according to the twenty-first aspect.

BRIEF DESCRIPTION OF DRAWINGS

FIG. 3-1 and FIG. 3-2 are a third schematic architectural diagram of a communications system according to an embodiment;

FIG. 3A-1 to FIG. 3A-3 are a first schematic diagram of an IAB node switching scenario according to an embodiment;

FIG. 4-1 and FIG. 4-2 are a second schematic diagram of an IAB node switching scenario according to an embodiment;

DETAILED DESCRIPTION OF THE EMBODIMENTS

The term "and/or" in the embodiments describes only an association relationship for describing associated objects and represents that there may be three relationships. For example, A and/or B may represent the following three cases: only A exists, both A and B exist, and only B exists.

In the embodiments, the terms "first", "second", and the like are intended to distinguish between different objects but do not describe a particular order of the objects. For example, a first IAB node, a second IAB node, and the like are used to distinguish different IAB nodes, but are not used to describe a specific order of the IAB nodes.

In the embodiments, the word such as "example" or "for example" is used to give an example, an illustration, or a description. Any embodiment or design scheme described as an "example" or "for example" in the embodiments should not be explained as being more preferred or having more advantages than another embodiment or design scheme. Exactly, use of the word "example" or "for example" is intended to present a relative concept in a specific manner.

In descriptions of the embodiments, unless otherwise stated, "a plurality of" means two or more. For example, a plurality of processing units are two or more processing units; and a plurality of systems are two or more systems.

First, some concepts related to an IAB node switching method and apparatus provided in the embodiments are explained and described.

Donor node: The donor node is a control node of an IAB node and UE in a communications system. A donor node of the IAB node may be the same as or different from a donor node of the UE. In the embodiments, the donor node may be a base station, and the base station may be a base station to which an IAB technology is applied. In other words, the donor node may be an IAB base station. Further, the donor node may alternatively be referred to as a donor node or the like. This is not limited in the embodiments.

IAB node: As a data forwarding node, the IAB node is located between a donor node and UE and is configured to forward an uplink signal or a downlink signal between the donor node and the UE. A plurality of hops of IAB nodes may exist between the donor node and the UE.

Backhaul link: The backhaul link refers to a link between a donor node and an IAB node.

Access link: The access link refers to a link between an IAB node and UE.

Figure 2:
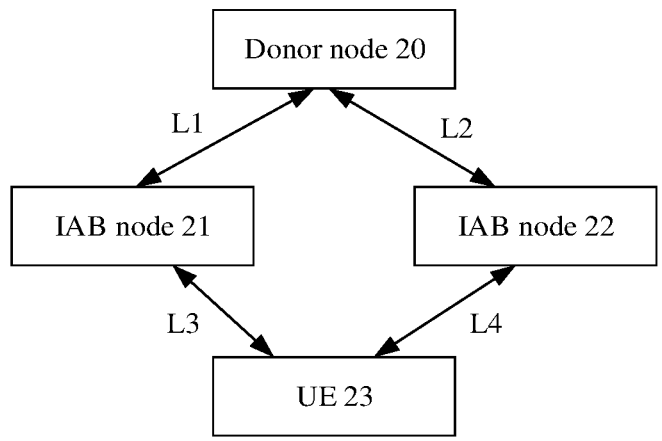
FIG. 2 is a second schematic architectural diagram of a communications system according to an embodiment.

For example, as shown in FIG. 2, a communications system includes one donor node 20, two IAB nodes: an IAB node 21 and an IAB node 22, and UE 23. In FIG. 2, a link L1 between the donor node 20 and the IAB node 21 and a link L2 between the donor node 20 and the IAB node 22 are both backhaul links. A link L3 between the IAB node 21 and the UE 23 and a link L4 between the IAB node 22 and the UE 23 are both access links. For the UE 23, a packet data convergence protocol (PDCP) layer protocol stack and a radio resource control (RRC) layer protocol stack that are equivalent to the UE 23 are located at the donor node 20, and a physical layer (PHY) protocol stack, a media access control (MAC) layer protocol stack, and a radio link control (RLC) layer protocol stack that are equivalent to the UE 23 are located at the IAB node 21 or the IAB node 22.

Figure 1:
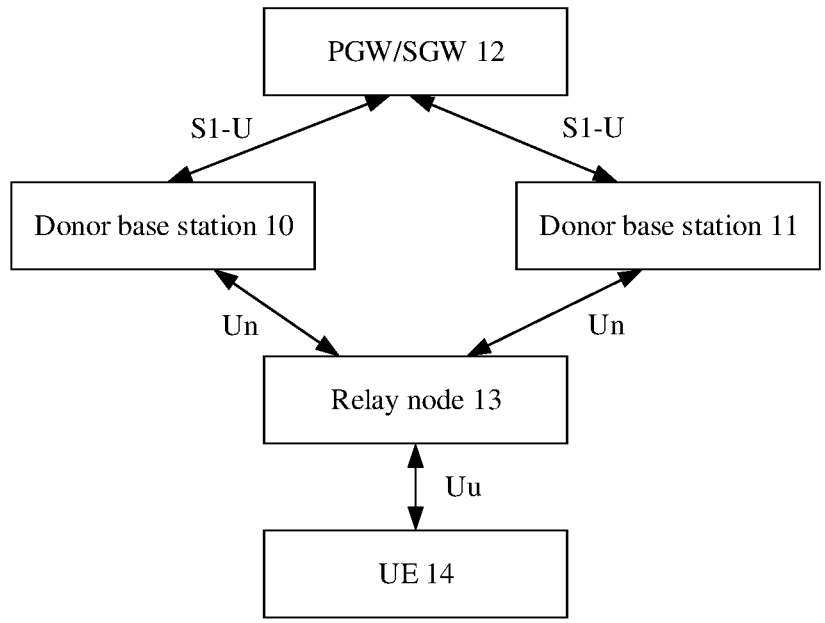
FIG. 1 is a first schematic architectural diagram of a communications system according to an embodiment.
Figures 1, 2, 3:
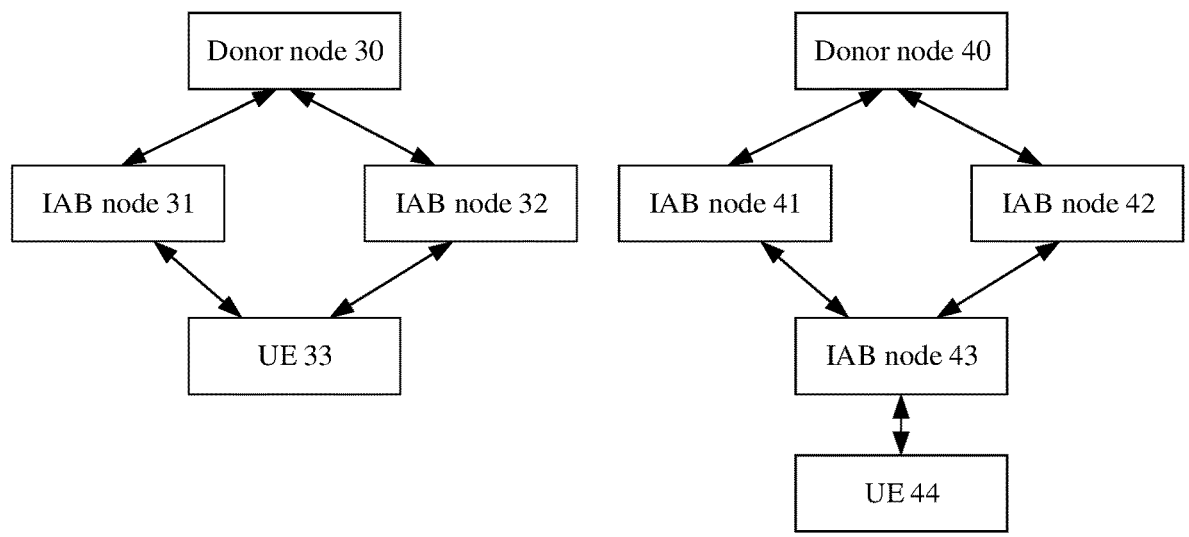

N-hop IAB backhaul link: The N-hop IAB backhaul link indicates that a quantity of hops of an IAB backhaul link included between the donor node and the UE is N (N is a positive integer greater than or equal to 1). An example is used for description. As shown in FIG. 3-1, a communications system includes one donor node 30, two IAB nodes (IAB node 31 and IAB node 32), and UE 33. The IAB node 31 and the IAB node 32 are IAB nodes at a same level. The donor node 30 may communicate with the UE 33 by using the IAB node 31, or the donor node 30 may communicate with the UE 33 by using the IAB node 32. It may be understood that because an IAB backhaul link between the donor node 30 and the UE 33 has only one hop, a scenario shown in FIG. 3-1 is a scenario of a one-hop IAB backhaul link.

As shown in FIG. 3-2, a communications system includes one donor node 40, three IAB nodes (IAB node 41, IAB node 42, and IAB node 43), and UE 44. The IAB node 41 and the IAB node 42 are IAB nodes at a same level, the IAB node 43 is an IAB node at a lower level, and the donor node 40 may communicate with the UE 44 by using the IAB node 41 and then by using the IAB node 43. Alternatively, the donor node 40 may communicate with the UE 44 by using the IAB node 42 and then by using the IAB node 43. It may be understood that an IAB backhaul link between the donor node 40 and the UE 44 includes two hops. A first hop is a backhaul link between the donor node 40 and the IAB node 41/IAB node 42, and a second hop is a backhaul link between the IAB node 41/IAB node 42 and the IAB node 43. The scenario shown in FIG. 3-2 is a scenario of a two-hop IAB backhaul link.

IAB node switching: For an IAB node (referred to as a to-be-switched IAB node herein), a parent node of the to-be-switched IAB node switches from one IAB node to another IAB node (for example, switching from a first IAB node to a second IAB node) After the to-be-switched IAB node is switched, a transmission path from a donor node to UE changes. In other words, the donor node communicates with the UE by using the IAB node after switching (for example, the second IAB node). Usually, network congestion or a radio link failure triggers IAB node switching, to ensure quality of communication between a donor node, an IAB node, and UE.

It may be understood that it is merely an example that the parent node of the to-be-switched IAB node is an IAB node. Optionally, in the embodiments of the present invention, the parent node of the to-be-switched IAB node may alternatively be a donor node, that is, the parent node of the to-be-switched IAB node switches from a donor node to another donor node. For example, in FIG. 3A-1, the parent node of the to-be-switched IAB node may switch from a source donor node to a target donor node. Optionally, the parent node of the to-be-switched IAB node may alternatively be a donor node or another IAB node, that is, the parent node of the to-be-switched IAB node switches from an IAB node to the donor node. For example, in FIG. 3A-2, the parent node of the to-be-switched IAB node switches from an IAB node to a target donor node. Alternatively, the parent node of the to-be-switched IAB nod switches from a donor node to an IAB node. For example, in FIG. 3A-3, the parent node of the to-be-switched IAB node switches from a source donor node to an IAB node. The donor node may be a donor node directly connected to an IAB node or connected by using another IAB node, or another donor node (that is, a donor node that is not connected to an IAB node).

In the embodiments, IAB node switching refers to switching a parent node of a third IAB node from a first node to a second node. The first node may be a donor node (for example, a source donor node or another donor node) or another IAB node. The second node may alternatively be a donor node (for example, a target donor node or another donor node) or another IAB node. When the first node is the donor node, the first node is a source donor node, and when the second node is a donor node, the second node is a target donor node.

The IAB node switching method provided in the embodiments may be applied to a multi-hop IAB backhaul link scenario. The following embodiments mainly use a two-hop IAB backhaul link as an example to describe the IAB node switching method. A to-be-switched IAB node is referred to as a third IAB node, a parent node of the third IAB node before switching is a first node, and the parent node of the third IAB node after switching is a second node. An example in which the first node is an IAB node and the second node is also an IAB node is used for description below. In other words, the parent node of the third IAB node before switching is referred to as a first IAB node, and the parent node of the third IAB node after the switching is referred to as a second IAB node. Before switching, a first-hop backhaul link is a link between the donor node and the first IAB node, and a second-hop backhaul link is a link between the first IAB node and the third IAB node. After switching, the first-hop backhaul link is a link between the donor node and the second IAB node, and the second-hop backhaul link is a link between the second IAB node and the third IAB node. In the embodiments, IAB node switching refers to switching of the parent node of the third IAB node between the first IAB node and the second IAB node. It may be understood that the foregoing is an example and does not limit the embodiments.

Transmission time unit configuration information of an IAB node: The transmission time unit configuration information of an IAB node is a time domain transmission resource used by the IAB node to perform signal transmission. It should be noted that in the embodiments, the IAB node works in a half-duplex mode, that is, the IAB node cannot communicate with a parent node and a child node of the IAB node at the same time. Therefore, a time division multiplexing (TDM) manner needs to be used. A time domain transmission resource used for communication between the IAB node and the parent node of the IAB node and a time domain transmission resource used for communication between the IAB node and the child node of the IAB node are staggered. In other words, when the IAB node communicates with the parent node of the IAB node, the IAB node does not communicate with the child node of the IAB node.

The third IAB node is used as an example. Transmission time unit configuration information of the third IAB node may include transmission time unit configuration information of a link (which may alternatively be referred to as a backhaul link) between the parent node of the third IAB node and the third IAB node, or transmission time unit configuration information of a link (which may also be referred to as an access link) between the third IAB node and a child node of the third IAB node, or transmission time unit configuration information of a link between the parent node of the third IAB node and the third IAB node and transmission time unit configuration information of a link between the third IAB node and a child node of the third IAB node. Therefore, the IAB node may communicate with the first IAB node/second IAB node based on the transmission time unit configuration information of the link between the parent node of the third IAB node and the third IAB node, and communicate with UE based on the transmission time unit configuration information of the link between the third IAB node and the child node of the third IAB node.

Optionally, in the embodiments, the transmission time unit may be a subframe, a symbol, a slot, or another transmission time unit. This is not limited in the embodiments.

The IAB node switching method and apparatus provided in the embodiments may be applied to a wireless communications system. The wireless communications system may include one or more donor nodes, one or more IAB nodes (corresponding to one hop or more hops), and one or more pieces of UE. If an architecture in which a centralized unit (CU) and a distributed unit (DU) are separated is used, a donor node includes a CU and a DU, and an IAB node includes a DU and a mobile terminal (MT). The CU of the donor node communicates with the DU of the donor node through a wired F1 interface, and a logical F1 interface is established between the CU of the donor node and a DU of an IAB node served by the CU of the donor node. In this way, the CU of the donor node can communicate with the DU of the IAB node served by the CU of the donor node, and the DU of the donor node directly communicates with an MT of a child node (for example, a next-hop IAB node) of the donor node. The MT of the IAB node communicates with a DU of a parent node (the parent node of the IAB node may be a donor node or another IAB node) of the IAB node, and the MT of the IAB node communicates with the DU of the IAB node through an internal interface of the IAB node. The DU of the IAB node communicates with a child node (the child node of the IAB node may be UE or may be another IAB node) of the IAB node. A detailed communication process between units of the donor node, units of the IAB node, and the UE is described in detail in the following embodiments.

Figures 1, 2, 4:
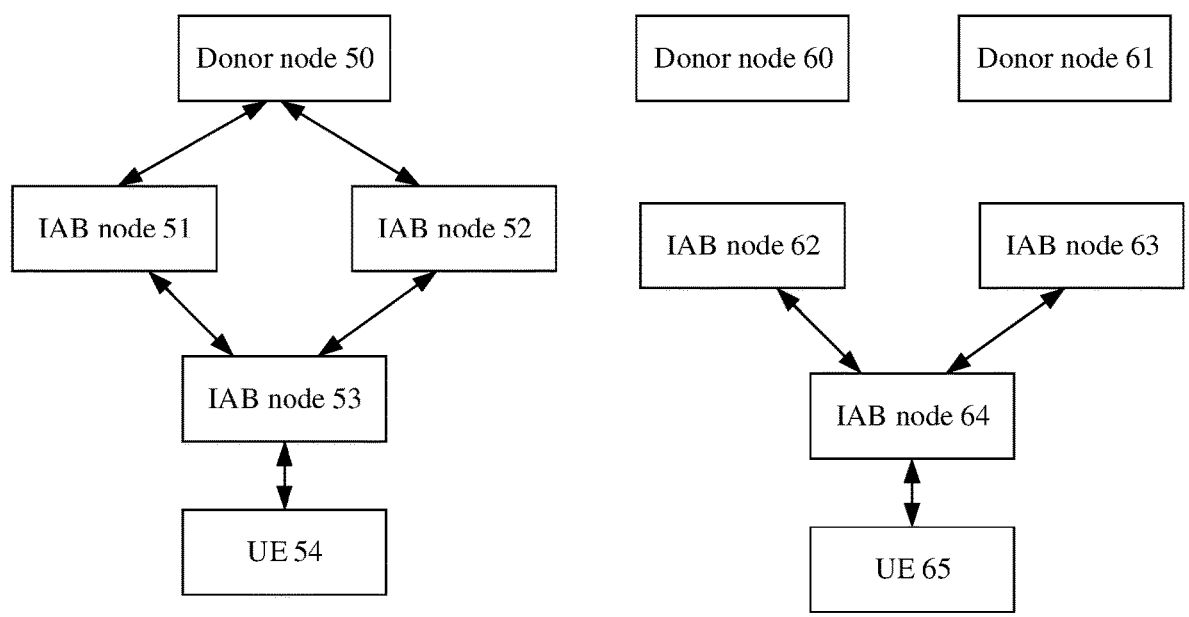

It may be understood that the IAB node switching method and apparatus provided in the embodiments may be applied to different scenarios, for example, a scenario in which switching is performed within a CU (referred to as an intra-CU switching scenario), and a scenario in which switching is performed between CUs (referred to as an inter-CU switching scenario). A two-hop IAB backhaul link is used as an example to separately describe the intra-CU switching scenario and the inter-CU switching scenario. FIG. 4-1 is a schematic architectural diagram of a wireless communications system corresponding to an intra-CU switching scenario. The wireless communications system includes a donor node 50, an IAB node 51, an IAB node 52, an IAB node 53, and UE 54. Intra-CU switching of an IAB node means that when a parent node of the IAB node 53 switches from the IAB node 51 to the IAB node 52, the donor node 50 remains unchanged. In this case, the donor node 50 is both a source donor node and a target donor node. FIG. 4-2 is a schematic architectural diagram of a wireless communications system corresponding to an inter-CU switching scenario. The wireless communications system includes a donor node 60, a donor node 61, an IAB node 62, an IAB node 63, an IAB node 64, and UE 65. Inter-CU switching of an IAB node means that when a parent node of the IAB node 64 switches from the IAB node 62 to the IAB node 63, a donor node changes, and switches from the donor node 60 to the donor node 61. In this case, the donor node 60 is a source donor node, and the donor node 61 is a target donor node.

Figure 5A:
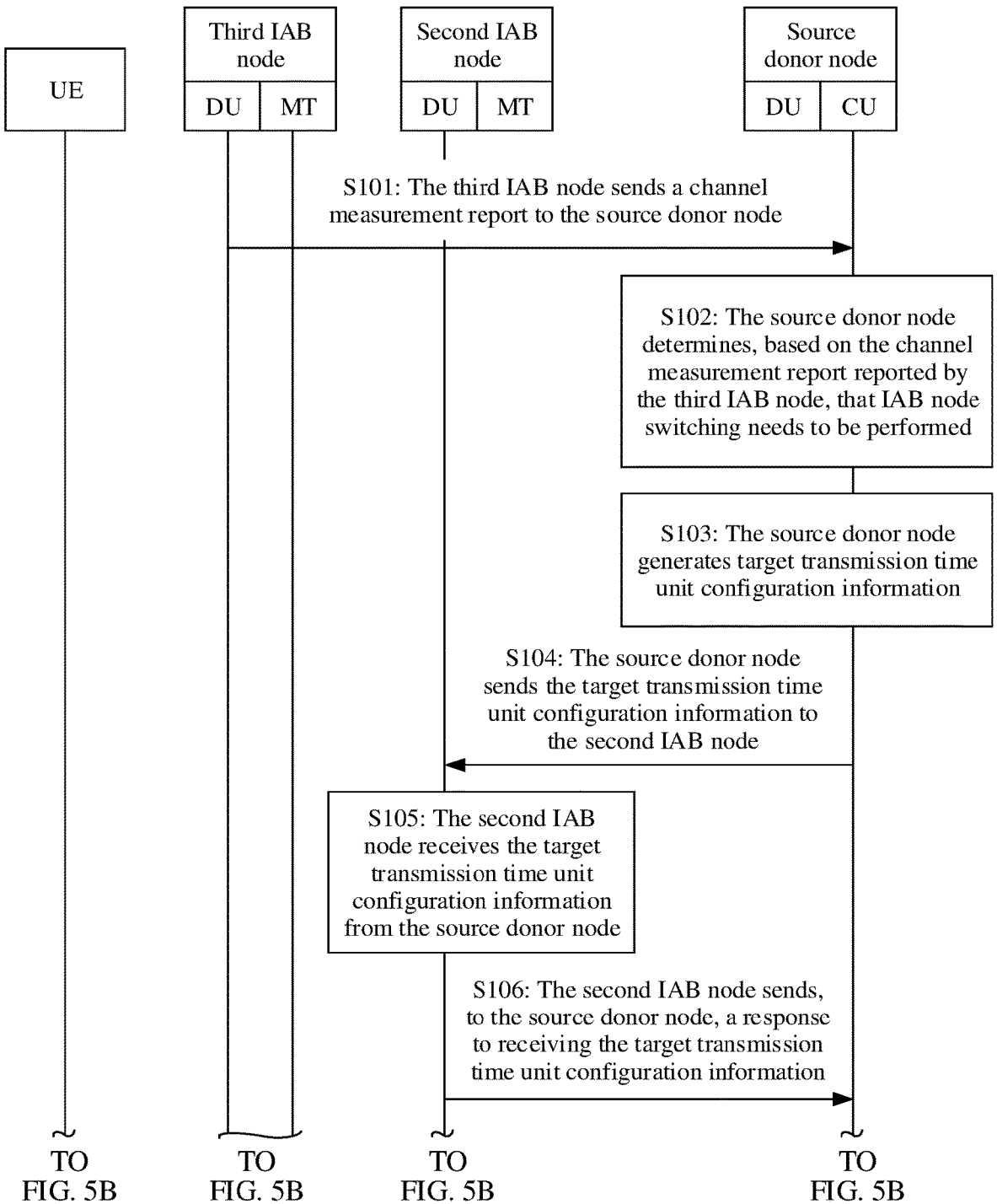
FIG. 5A and FIG. 5B are a first schematic diagram of an IAB node switching method according to an embodiment.
Figure 5B:
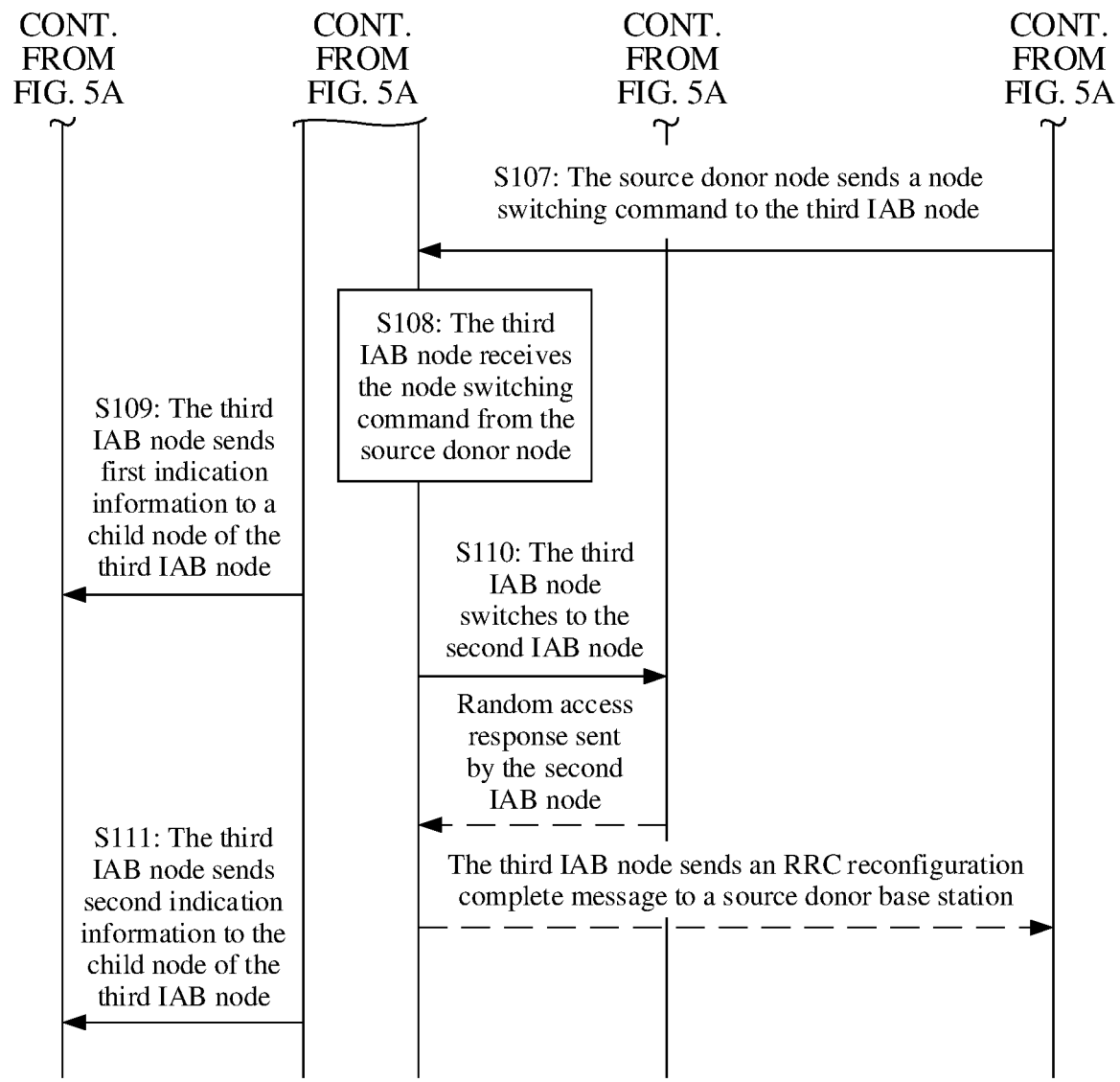

With reference to the intra-CU switching scenario shown in FIG. 4-1, as shown in FIG. 5A and FIG. 5B, in a first implementation, the IAB node switching method provided in the embodiments may include S101 to S111.

S101: A third IAB node sends a measurement report to a source donor node.

That a third IAB node sends a measurement report to a source donor node includes: An MT of the third IAB node sends the RRM measurement report to a CU of the source donor node.

In the embodiments, the third IAB node sends the measurement report to the source donor node by using an RRC message. The measurement report includes an indicator that reflects channel quality between the third IAB node and a parent node of the third IAB node, for example, reference signal received power (RSRP) or reference signal received quality (RSRQ).

It may be understood that, in the intra-CU switching scenario, the source donor node is the same as a target donor node, and the two are collectively referred to as the source donor node is herein. This does not limit the embodiments. In addition, the source donor node is a control node of a first IAB node, a control node of a second IAB node, and a control node of the third IAB node. For example, an RRC layer equivalent to the first IAB node is located at the source donor node, an RRC layer equivalent to the second IAB node is located at the source donor node, and an RRC layer equivalent to the third IAB node is located at the source donor node.

S102: The source donor node determines, based on the measurement report reported by the third IAB node, that IAB node switching needs to be performed.

When the source donor node determines, based on the measurement report reported by the third IAB node, that channel quality between the third IAB node and the parent node of the third IAB node is relatively poor, the source donor node determines that IAB node switching needs to be performed, that is, determines that the parent node of the third IAB node needs to switch from a current IAB node (for example, the first IAB node) to another IAB node (for example, the second IAB node), to ensure channel quality of the third IAB node.

S103: The source donor node generates target transmission time unit configuration information.

The target transmission time unit configuration information may include at least one of the following: target transmission time unit configuration information of a link between the second IAB node and the third IAB node, target transmission time unit configuration information of a link between the third IAB node and a child node of the third IAB node, or target transmission time unit configuration information of a link between the second IAB node and the third IAB node and target transmission time unit configuration information of a link between the third IAB node and a child node of the third IAB node.

In a possible implementation, the source donor node may generate the target transmission time unit configuration information based on source transmission time unit configuration information of the third IAB node, and the source transmission time unit configuration information may include at least one of the following: source transmission time unit configuration information of a link between the first IAB node and the third IAB node, source transmission time unit configuration information of the link between the third IAB node and the child node of the third IAB node, or source transmission time unit configuration information of a link between the first IAB node and the third IAB node and source transmission time unit configuration information of the link between the third IAB node and the child node of the third IAB node. For example, the source donor node may not change a source transmission time unit of the link between the third IAB node and the child node of the third IAB node, but uses the source transmission time unit configuration information of the link between the third IAB node and the child node of the third IAB node as the target transmission time unit configuration information of the link between the third IAB node and the child node of the third IAB node.

In the embodiments, the source transmission time unit configuration information of the link between the first IAB node and the third IAB node may include uplink transmission time unit configuration information used by the third IAB node to send information to the first IAB node and downlink transmission time unit configuration information used by the first IAB node to send information to the third IAB node. The source transmission time unit configuration information of the link between the third IAB node and the child node of the third IAB node may include uplink transmission time unit configuration information used by the child node of the third IAB node to send information to the third IAB node and downlink transmission time unit configuration information used by the third IAB node to send information to the child node of the third IAB node.

Optionally, the source transmission time unit configuration information of the third IAB node may further include other transmission time unit configuration information, and the other transmission time unit configuration information may be used for link communication between the first IAB node and the third IAB node, or may be used for link communication between the third IAB node and the child node of the third IAB node. However, a transmission time unit can be used only for one type of link communication at a same moment.

In another possible implementation, the source donor node may generate new transmission time unit configuration information (that is, the target transmission time unit configuration information) without considering the source transmission time unit configuration information of the third IAB node. The new transmission time unit configuration information may be completely or partially different from the source transmission time unit configuration information.

Optionally, the source donor node may generate new transmission time unit information based on source transmission time unit configuration information of the second IAB. For example, the source donor node may not change source transmission time unit configuration information of a link between the source donor node and the second IAB node and/or source transmission time unit configuration information of a link between the second IAB node and a child node of the second IAB node. The source donor node uses the source transmission time unit configuration information of the link between the second IAB node and the child node of the second IAB node as the target transmission time unit configuration information of the link between the second IAB node and the third IAB node. Because the source donor node does not change the source transmission time unit configuration information of the link between the second IAB node and the child node of the second IAB node, data transmission between the second IAB node and a next-hop node of the second IAB node (which may be an IAB node or UE) is not affected.

In the embodiments, because an IAB node works in a half-duplex mode, a time domain transmission resource used for communication between the IAB node and a parent node of the IAB node and a time domain transmission resource used for communication between the IAB node and a child node of the IAB node may be staggered in a TDM manner. Optionally, a time domain transmission resource of the third IAB node includes only the target transmission time unit configuration information of the link between the second IAB node and the third IAB node and the target transmission time unit configuration information of the link between the third IAB node and the child node of the third IAB node. For example, when the target transmission time unit configuration information of the link between the second IAB node and the third IAB node is complementary to the target transmission time unit configuration information of the link between the third IAB node and the child node of the third IAB node, the source donor node may generate only the target transmission time unit configuration information of the link between the second IAB node and the third IAB node, and configure the target transmission time unit configuration information for the third IAB node, so that the third IAB node can obtain the target transmission time unit configuration information of the link between the third IAB node and the child node of the third IAB node through calculation based on the target transmission time unit configuration information of the link between the second IAB node and the third IAB node. Alternatively, the source donor node may generate only the target transmission time unit configuration information of the link between the third IAB node and the child node of the third IAB node, and configure the target transmission time unit configuration information for the third IAB node, so that the third IAB node can obtain the target transmission time unit configuration information of the link between the second IAB node and the third IAB node through calculation based on the target transmission time unit configuration information of the link between the third IAB node and the child node of the third IAB node.

Optionally, when a time domain transmission resource of the third IAB node includes the target transmission time unit configuration information of the link between the second IAB node and the third IAB node, the target transmission time unit configuration information of the link between the third IAB node and the child node of the third IAB node, and other transmission time unit configuration information, the source donor node generates the target transmission time unit configuration information of the link between the second IAB node and the third IAB node, the target transmission time unit configuration information of the link between the third IAB node and the child node of the third IAB node, and the other transmission time unit configuration information, and then configures the target transmission time unit configuration information of the link between the second IAB node and the third IAB node, the target transmission time unit configuration information of the link between the third IAB node and the child node of the third IAB node, and the other transmission time unit configuration information for the third IAB node. A purpose of a transmission time unit indicated by the other transmission time unit configuration information may not be fixed, that is, may be used for link communication between the second IAB node and the third IAB node, or may be used for link communication between the third IAB node and the child node of the third IAB node. However, the transmission time unit can be used only for one type of link communication at a same moment.

In the embodiments, the target transmission time unit configuration information of the link between the second IAB node and the third IAB node may include uplink transmission time unit configuration information used by the third IAB node to send information to the second IAB node and downlink transmission time unit configuration information used by the second IAB node to send information (the information may be user plane data, or may be control plane signaling) to the third IAB node. The target transmission time unit configuration information of the link between the third IAB node and the child node of the third IAB node may include uplink transmission time unit configuration information used by the child node of the third IAB node to send information to the third IAB node and downlink transmission time unit configuration information used by the third IAB node to send information to the child node of the third IAB node.

S104: The source donor node sends the target transmission time unit configuration information to the second IAB node.

Optionally, in the embodiments, the source donor node may send a UE context setup request message (the request message is an F1AP message) that carries the target transmission time unit configuration information, to send the target transmission time unit configuration information to the second IAB node.

It should be understood that, that the source donor node sends the target transmission time unit configuration information to the second IAB node includes: The CU of the source donor node sends the target transmission time unit configuration information to a DU of the second IAB node.

Optionally, that the source donor node sends the target transmission time unit configuration information to the second IAB node may alternatively be: the CU of the source donor node sends the target transmission time unit configuration information to an MT of the second IAB node.

S105: The second IAB node receives the target transmission time unit configuration information from the source donor node.

It should be understood that, that the second IAB node receives the target transmission time unit configuration information from the source donor node includes: The DU of the second IAB node receives the target transmission time unit configuration information from the CU of the source donor node.

For example, with reference to S103, if the target transmission time unit configuration information is the target transmission time unit configuration information of the link between the third IAB node and the child node of the third IAB node, after the second IAB node receives the target transmission time unit configuration information from the source donor node, the second IAB node may obtain the target transmission time unit configuration information of the link between the second IAB node and the third IAB node through calculation based on the target transmission time unit configuration information of the link between the third IAB node and the child node of the third IAB node.

Optionally, that the second IAB node receives the target transmission time unit configuration information from the source donor node may alternatively be: the MT of the second IAB node receives the target transmission time unit configuration information from the CU of the source donor node.

S106: The second IAB node sends, to the source donor node, a response to receiving the target transmission time unit configuration information.

It should be understood that the second IAB node may send a UE context setup response message (the response message is an F1AP message), to respond to receiving the target transmission time unit configuration information sent by the source donor node. That the second IAB node sends a UE context setup response message to the source donor node includes: the DU of the second IAB node sends the UE context setup response message to the CU of the source donor node.

With reference to S104, correspondingly, after receiving the target transmission time unit configuration information, the second IAB node may send the UE context setup response message (the response message is an F1AP message), to notify the source donor node that the second IAB node successfully receives the target transmission time unit configuration information.

Optionally, the second IAB node may alternatively send an RRC message, to respond to receiving the target transmission time unit configuration information sent by the source donor node. For example, the MT of the second IAB node sends the RRC message to the CU of the source donor node as a response.

S107: The source donor node sends a node switching command to the third IAB node.

It should be understood that, that the source donor node sends a node switching command to the third IAB node includes: the CU of the source donor node sends the node switching command to the MT of the third IAB node. The node switching command is used to indicate the parent node of the third IAB node to switch to the second IAB node. For example, the parent node of the third IAB node switches from the first IAB node to the second IAB node, that is, the first IAB node is a source parent node of the third IAB node, and the second IAB node is a target parent node of the third IAB node.

In the embodiments, the node switching command includes the target transmission time unit configuration information. It should be noted that, after the source donor node generates the target transmission time unit configuration information, the source donor node sends the target transmission time unit configuration information to both the second IAB node and the third IAB node. In addition, a sequence in which the source donor node sends the target transmission time unit configuration information to the second IAB node and the third IAB node is not limited in the embodiments, that is, an execution sequence of S104 and S107 may not be limited. The source donor node may perform S104 before S107, or may perform S107 before S104, or may simultaneously perform S104 and S107.

S108: The third IAB node receives the node switching command from the source donor node.

It should be understood that, that the third IAB node receives the node switching command from the source donor node includes: the MT of the third IAB node receives the node switching command from the CU of the source donor node. Optionally, the node switching command may be carried in an RRC reconfiguration message sent by the source donor node.

S109: The third IAB node sends first indication information to the child node of the third IAB node.

The first indication information indicates the child node of the third IAB node to interrupt transmission with the third IAB node. For example, that the first indication information indicates the child node of the third IAB node to interrupt transmission with the third IAB node includes:

The first indication information indicates the child node to perform one or a combination of the following operations: suspending a physical uplink control channel (PUCCH) resource between the third IAB node and the child node, suspending a physical random access channel (PRACH) resource between the third IAB node and the child node, stopping an uplink synchronous timer, stopping a timer related to a scheduling request (SR), stopping a timer related to a buffer status report (BSR), stopping a timer related to RLC retransmission, stopping a timer related to RLC data reassembly, stopping a timer related to an RLC status report, stopping a PDCP packet loss timer, stopping a PDCP layer reordering timer, stopping radio resource management (RRM) measurement between the third IAB node and the child node, stopping reading a system broadcast message, and stopping data transmission with the third IAB node.

For example, the suspending a PUCCH resource may include: the child node (for example, UE) of the third IAB node stops sending a hybrid automatic repeat request (HARQ) feedback on downlink data on the PUCCH resource, or stops sending a periodic SR on the PUCCH resource. The suspending a PRACH resource may include: the child node of the third IAB node stops sending a preamble sequence on the PRACH resource. The stopping RRM measurement between the third IAB node and the child node means that the child node of the third IAB node no longer performs measurement or reports a measurement result. The stopping data transmission with the third IAB node may include: the child node of the third IAB node no longer receives a PDSCH or sends a PUSCH. The timer related to an SR may include sr-ProhibitTimer. The timer related to a BSR includes periodicB SR-Timer. The timer related to RLC retransmission includes t-PollRetransmit. The timer related to RLC data reassembly includes t-Reassembly. The timer related to an RLC status report includes t-StatusProhibit. The PDCP packet loss timer includes discardTimer. The PDCP layer reordering timer includes t-Reordering.

For example, in a case, the child node of the third IAB node may suspend the PUCCH resource and the PRACH resource.

For example, in another case, the child node of the third IAB node may suspend the PUCCH resource and the PRACH resource and stop the data transmission with the third IAB node.

For example, in still another case, the child node of the third IAB node may suspend the PUCCH resource and the PRACH resource, stop the data transmission with the third IAB node, and stop the uplink synchronous timer.

Correspondingly, after the third IAB node sends the first indication information to the child node of the third IAB node, the third IAB node returns to a UE mode, that is, suspends a DU of the third IAB node. For example, the third IAB node performs at least one of the following operations: stopping sending data to the child node of the third IAB node, stopping receiving data from the child node of the third IAB node, stopping broadcasting a system message, and stopping sending a reference signal.

For example, the reference signal may be a cell-level synchronization signal block (SSB) signal or may be a user-level channel state information reference signal (CSI-RS), or may be another reference signal.

It may be understood that the child node of the third IAB node may be UE, and the third IAB node may be another IAB node. This is not limited in the embodiments. For example, if the child node of the third IAB node is an IAB node (for example, referred to as a fourth IAB node), the third IAB node sends the first indication information to the fourth IAB node, to indicate the fourth IAB node to interrupt transmission with the third IAB node. However, transmission between the fourth IAB node and a child node (UE or an IAB node) of the fourth IAB node is not affected.

Optionally, the first indication information may be explicit indication information, or may be implicit indication information. This is not limited in the embodiments. When the child node of the third IAB node receives the first indication information, the child node of the third IAB node interrupts transmission with the third IAB. Optionally, the first indication information may be carried in an RRC message, an F1AP message, PDCCH DCI, or a MAC CE. In this way, the child node of the third IAB node may obtain the first indication information from the RRC message, the F1AP message, the PDCCH DCI, or the MAC CE, and then interrupt transmission with the third IAB.

S110: The third IAB node switches to the second IAB node.

In the embodiments, that the third IAB node switches to the second IAB node includes: the third IAB node initiates random access to the second IAB node, that is, the third IAB node sends a random access preamble sequence to the second IAB node. A transmission time unit used by the third IAB node to initiate random access is one or more transmission time units included in the target transmission time unit configuration information of the link between the second IAB node and the third IAB node.

It should be noted that, in the embodiments, the random access initiated by the third IAB node to the second IAB node may be contention-free random access, and a contention-free random access process of the third IAB node may include: The third IAB node sends the random access preamble sequence to the second IAB node, and receives a random access response sent by the second IAB node. Further, after the third IAB node accesses the second IAB node, the third IAB node sends an RRC reconfiguration complete message to the source donor node, to notify the source donor node that the random access of the third IAB node succeeds.

S111: The third IAB node sends second indication information to the child node of the third IAB node.

The second indication information indicates the child node of the third IAB node to resume transmission with the third IAB node, and that the second indication information indicates the child node of the third IAB node to resume transmission with the third IAB node includes:

The second indication information indicates the child node of the third IAB node to perform one or a combination of the following operations: resuming the PUCCH resource between the third IAB node and the child node of the third IAB node, resuming the PRACH resource between the third IAB node and the child node of the third IAB node, resuming the uplink synchronous timer, resuming the timer related to an SR, resuming the timer related to a BSR, resuming the timer related to RLC retransmission, resuming the timer related to RLC data reassembly, resuming the timer related to an RLC status report, resuming the PDCP packet loss timer, resuming the PDCP layer reordering timer, resuming the RRM measurement between the third IAB node and the child node of the third IAB node, resuming reading the system broadcast message, and resuming the data transmission with the third IAB node.

It may be understood that, in the embodiments, in S109, the first indication information sent by the third IAB node indicates resources that are suspended or operations that are stopped by the child node of the third IAB node. In this case, after the third IAB node successfully accesses the second IAB node, the second indication information sent by the third IAB node indicates the child node of the third IAB node to resume the corresponding resources or operations. The operation of resuming the timer may be resetting the timer (the timer starts counting from zero), or continuing counting from an original count value. This is not limited in the embodiments.

It should be noted that the resuming the PUCCH resource means that the child node of the third IAB node starts to use the PUCCH resource, and the PUCCH resource may be a source PUCCH resource (that is, the PUCCH resource does not change, and in this case, the child node of the third IAB node continues to use the originally configured PUCCH resource). The PUCCH resource may alternatively be a newly configured PUCCH resource. After obtaining the newly configured PUCCH resource, the child node of the third IAB node starts to use the newly configured PUCCH resource.

Similarly, the resuming the PRACH resource, or the resuming the PUCCH resource and the PRACH resource is similar to the resuming the PUCCH resource, and details are not described herein again.

Optionally, similar to the first indication information, the second indication information may be explicit indication information, or may be implicit indication information. This is not limited in the embodiments. When the child node of the third IAB node receives the second indication information, the child node of the third IAB node resumes transmission with the third IAB. Optionally, the second indication information may be carried in an RRC message, an F1AP message, PDCCH DCI, or a MAC CE. In this way, the child node of the third IAB node may obtain the second indication information from the RRC message, the F1AP message, the PDCCH DCI, or the MAC CE, and then resume transmission with the third IAB.

In this case, by performing S101 to S111, the parent node of the third IAB node switches from the first IAB node to the second IAB node, and both the third IAB node and the second IAB node receive the target transmission time unit configuration information generated by the source donor node. Therefore, the source donor node may continue to communicate with the UE by using the second IAB node and the third IAB node.

Thus, in the first implementation corresponding to the intra-CU switching scenario, the target transmission time unit configuration information of the third IAB node is generated by the source donor node, and then the source donor node separately sends the target transmission time unit configuration information to the second IAB node and the third IAB node, so that the third IAB node switches to the second IAB node.

Figure 6A:
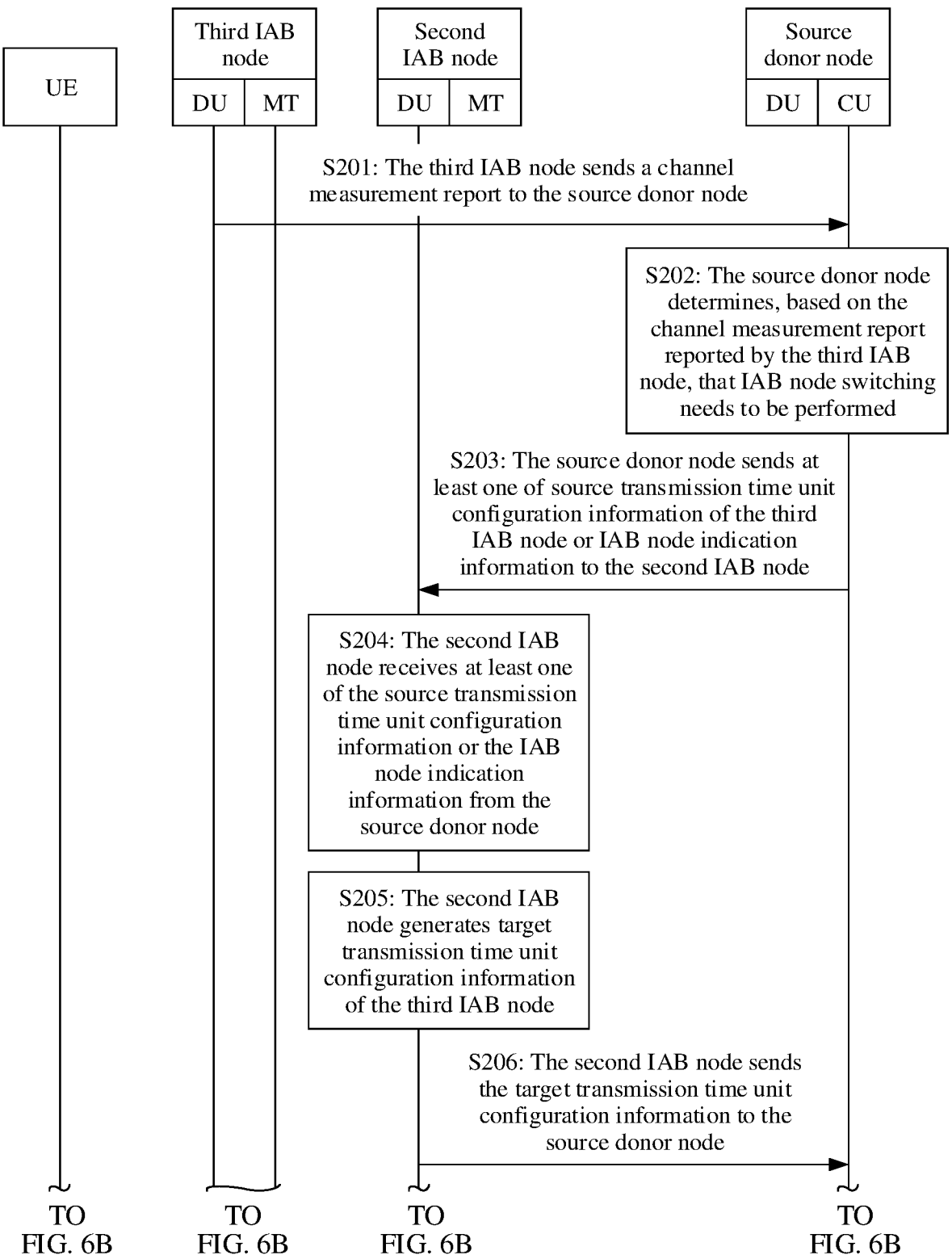
FIG. 6A and FIG. 6B are a second schematic diagram of an IAB node switching method according to an embodiment.
Figure 6B:
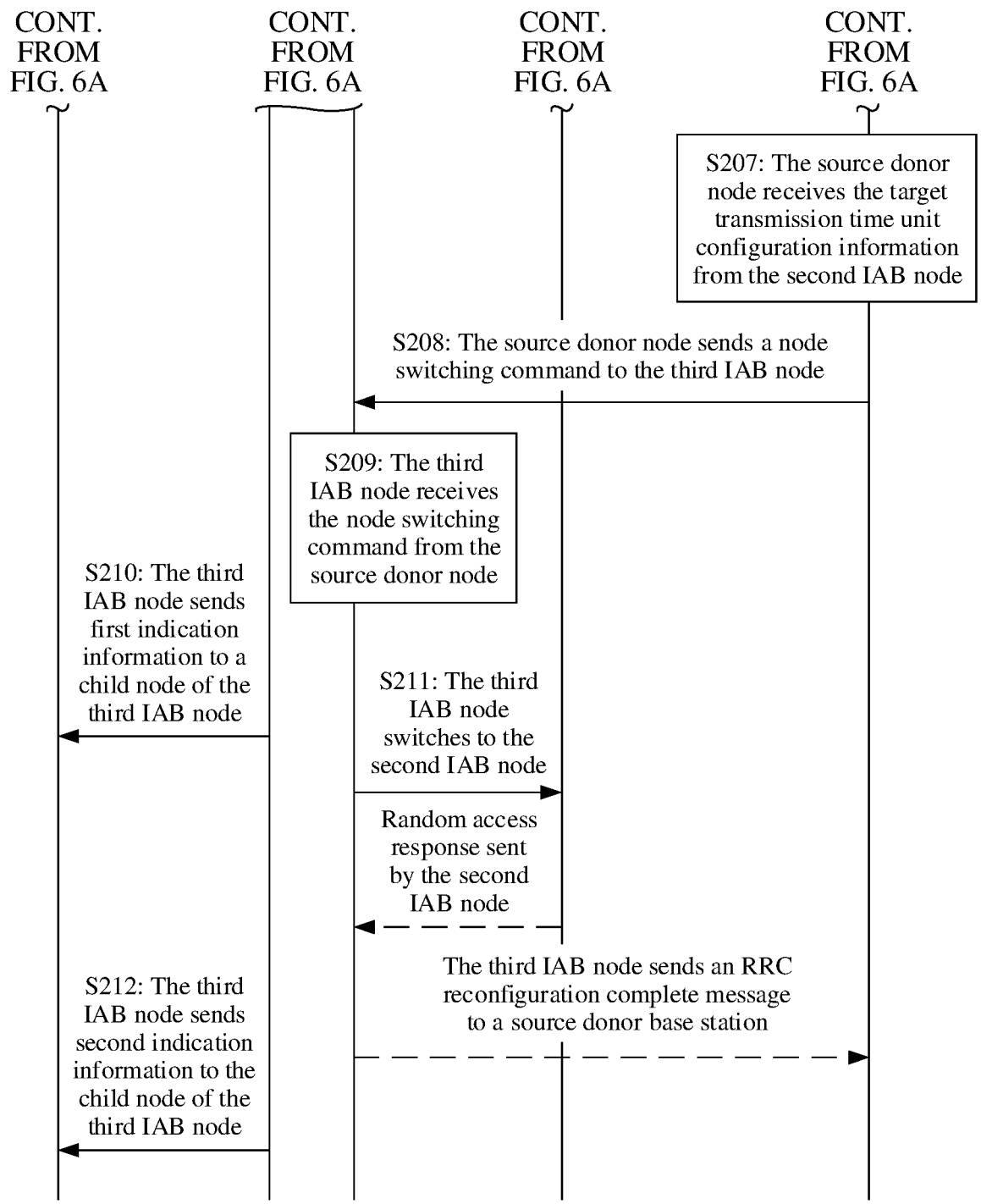

With reference to the intra-CU switching scenario shown in FIG. 4-1, as shown in FIG. 6A and FIG. 6B, in a second implementation, the IAB node switching method provided in the embodiments may include S201 to S212.

S201: A third IAB node sends a measurement report to a source donor node.

S202: The source donor node determines, based on the measurement report reported by the third IAB node, that IAB node switching needs to be performed.

For detailed descriptions of S201 and S202, refer to descriptions of S101 and S102 in the foregoing embodiment. Details are not described herein again.

S203: The source donor node sends at least one of source transmission time unit configuration information of the third IAB node or IAB node indication information to a second IAB node.

It should be understood that, that the source donor node sends at least one of source transmission time unit configuration information of the third IAB node or IAB node indication information to a second IAB node includes: a CU of the source donor node sends at least one of the source transmission time unit configuration information of the third IAB node or the IAB node indication information to a DU of the second IAB node. The IAB node indication information is used to indicate that a to-be-switched node is an IAB node.

The source transmission time unit configuration information of the third IAB node includes at least one of the following: source transmission time unit configuration information of a link between a first IAB node and the third IAB node, source transmission time unit configuration information of a link between the third IAB node and a child node of the third IAB node, or source transmission time unit configuration information of a link between a first IAB node and the third IAB node and source transmission time unit configuration information of a link between the third IAB node and a child node of the third IAB node.

Optionally, in the embodiments, the source donor node may carry at least one of the source transmission time unit configuration information or the IAB node indication information in a UE context setup request message and send the UE context setup request message to the second IAB node.

Optionally, the CU of the source donor node may alternatively carry the source transmission time unit configuration information in an RRC message, and send the RRC message to an MT of the second IAB node, and the MT of the second IAB node sends the RRC message to the DU of the second IAB node through an internal interface.

Optionally, in the embodiments, before the source donor node sends at least one of the source transmission time unit configuration information of the third IAB node or the IAB node indication information to the second IAB node, the source donor node may alternatively receive the source transmission time unit configuration information of the third IAB node from the first IAB node, where the source transmission time unit configuration information of the third IAB node is generated by the first IAB node.

S204: The second IAB node receives at least one of the source transmission time unit configuration information or the IAB node indication information from the source donor node.

It should be understood that, that the second IAB node receives at least one of the source transmission time unit configuration information or the IAB node indication information from the source donor node includes: the DU of the second IAB node receives at least one of the source transmission time unit configuration information or the IAB node indication information from the CU of the source donor node.

In the embodiments, after the second IAB node receives at least one of the source transmission time unit configuration information or the IAB node indication information, the second IAB node may learn that the to-be-switched node is an IAB node. For example, when the second IAB node receives only the IAB node indication information, the second IAB node may learn, based on indication of the IAB node indication information, that the to-be-switched node is an IAB node; when the second IAB node receives only the source transmission time unit configuration information, the source transmission time unit configuration information may implicitly indicate an IAB node. In this way, the second IAB node may learn that the to-be-switched node is an IAB node.

S205: The second IAB node generates target transmission time unit configuration information of the third IAB node.

It should be understood that, that the second IAB node generates target transmission time unit configuration information of the third IAB node includes: the DU of the second IAB node generates the target transmission time unit configuration information of the third IAB node.

The target transmission time unit configuration information may include at least one of the following: target transmission time unit configuration information of a link between the second IAB node and the third IAB node, target transmission time unit configuration information of a link between the third IAB node and a child node of the third IAB node, or target transmission time unit configuration information of a link between the second IAB node and the third IAB node and target transmission time unit configuration information of a link between the third IAB node and a child node of the third IAB node.

In a possible implementation, the second IAB node receives the source transmission time unit configuration information of the third IAB node from the source donor node, and the second IAB node may generate the target transmission time unit configuration information based on the source transmission time unit configuration information.

In another possible implementation, the second IAB node may directly generate new transmission time unit configuration information (that is, the target transmission time unit configuration information) without considering the source transmission time unit configuration information. The new transmission time unit configuration information may be completely different from or partially different from the source transmission time unit configuration information.

It may be understood that the method for generating the target transmission time unit configuration information by the second IAB node is similar to the foregoing method for generating the target transmission time unit by the source donor node. For other descriptions of generating the target transmission time unit configuration information by the second IAB node, refer to related descriptions in the foregoing embodiment. Details are not described herein again.

S206: The second IAB node sends the target transmission time unit configuration information to the source donor node.

It should be understood that, that the second IAB node sends the target transmission time unit configuration information to the source donor node includes: the DU of the second IAB node sends the target transmission time unit configuration information to the CU of the source donor node.

S207: The source donor node receives the target transmission time unit configuration information from the second IAB node.

It should be understood that, that the source donor node receives the target transmission time unit configuration information from the second IAB node includes: the CU of the source donor node receives the target transmission time unit configuration information from the DU of the second IAB node.

S208: The source donor node sends a node switching command to the third IAB node.

It should be understood that, that the source donor node sends a node switching command to the third IAB node includes: the CU of the source donor node sends the node switching command to an MT of the third IAB node. The node switching command is used to indicate a parent node of the third IAB node to switch to the second IAB node. For example, the parent node of the third IAB node is switched from the first IAB node to the second IAB node.

In the embodiments, the node switching command includes the target transmission time unit configuration information received by the source donor node from the second IAB node.

S209: The third IAB node receives the node switching command from the source donor node.

S210: The third IAB node sends first indication information to the child node of the third IAB node.

The first indication information indicates the child node of the third IAB node to interrupt transmission with the third IAB node. For example, that the first indication information indicates the child node of the third IAB node to interrupt transmission with the third IAB node includes:

The first indication information indicates the child node of the third IAB node to perform one or a combination of the following operations: suspending a PUCCH resource between the third IAB node and the child node, suspending a PRACH resource between the third IAB node and the child node, stopping an uplink synchronous timer, stopping a timer related to an SR, stopping a timer related to a BSR, stopping a timer related to RLC retransmission, stopping a timer related to RLC data reassembly, stopping a timer related to an RLC status report, stopping a PDCP packet loss timer, stopping a PDCP layer reordering timer, stopping RRM measurement between the third IAB node and the child node, stopping reading a system broadcast message, and stopping data transmission with the third IAB node.

Correspondingly, after the third IAB node sends the first indication information to the child node of the third IAB node, the third IAB node returns to a UE mode, that is, suspends a DU of the third IAB node. For example, the third IAB node performs at least one of the following operations: stopping sending data to the child node of the third IAB node, stopping receiving data from the child node of the third IAB node, stopping broadcasting a system message, and stopping sending a reference signal.

Similar to the first indication information in S109, the first indication information in S210 may be explicit indication information or may be implicit indication information. This is not limited in the embodiments.

S211: The third IAB node switches to the second IAB node.

In the embodiments, that the third IAB node switches to the second IAB node includes: the third IAB node initiates random access to the second IAB node, that is, the third IAB node sends a random access preamble sequence to the second IAB node. A transmission time unit used by the third IAB node to initiate random access is one or more transmission time units included in the target transmission time unit configuration information of the link between the second IAB node and the third IAB node.

S212: The third IAB node sends second indication information to the child node of the third IAB node.

The second indication information indicates the child node of the third IAB node to resume transmission with the third IAB node, and that the second indication information indicates the child node of the third IAB node to resume transmission with the third IAB node includes the following.

The second indication information indicates the child node of the third IAB node to perform one or a combination of the following operations: resuming the PUCCH resource between the third IAB node and the child node of the third IAB node, resuming the PRACH resource between the third IAB node and the child node of the third IAB node, resuming the uplink synchronous timer, resuming the timer related to an SR, resuming the timer related to a BSR, resuming the timer related to RLC retransmission, resuming the timer related to RLC data reassembly, resuming the timer related to an RLC status report, resuming the PDCP packet loss timer, resuming the PDCP layer reordering timer, resuming the RRM measurement between the third IAB node and the child node of the third IAB node, resuming reading the system broadcast message, and resuming the data transmission with the third IAB node.

Similar to the second indication information in S111, the second indication information in S212 may be explicit indication information or may be implicit indication information. This is not limited in the embodiments.

It may be understood that, in S210, the first indication information sent by the third IAB node indicates resources that are suspended or operations that are stopped by the child node of the third IAB node, and after the third IAB node successfully accesses the second IAB node, the second indication information sent by the third IAB node indicates the child node of the third IAB node to resume corresponding resources or operations.

For descriptions of other content of S209 to S212, refer to descriptions of S107 to S111 in the foregoing embodiment. Details are not described herein again.

In the embodiments, the third IAB node may carry the first indication information and/or the second indication information in an RRC message, an F1AP message, a MAC CE, or PDCCH DCI, and send the first indication information and/or the second indication information to the child node of the third IAB node. This is not limited in the embodiments.

Therefore, the second implementation corresponding to the intra-CU switching scenario differs from the first implementation corresponding to the intra-CU switching scenario in that: The target transmission time unit configuration information of the third IAB node is generated by the second IAB node, the second IAB node sends the target transmission time unit configuration information to the source donor node, and then the source donor node sends the target transmission time unit configuration information to the third IAB node, so that the third IAB node switches to the second IAB node.

Figure 7A:
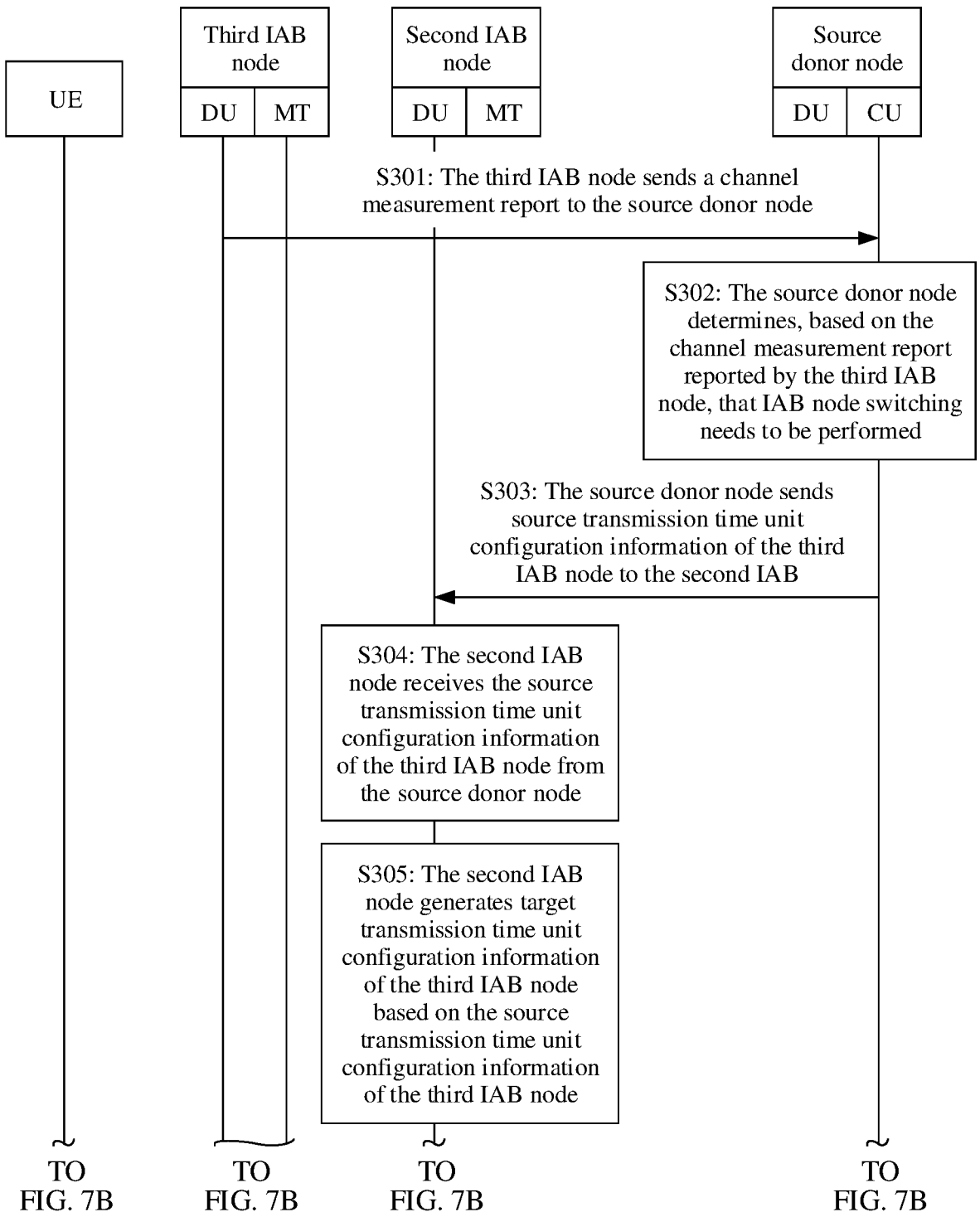
FIG. 7A and FIG. 7B are a third schematic diagram of an IAB node switching method according to an embodiment.
Figure 7B:
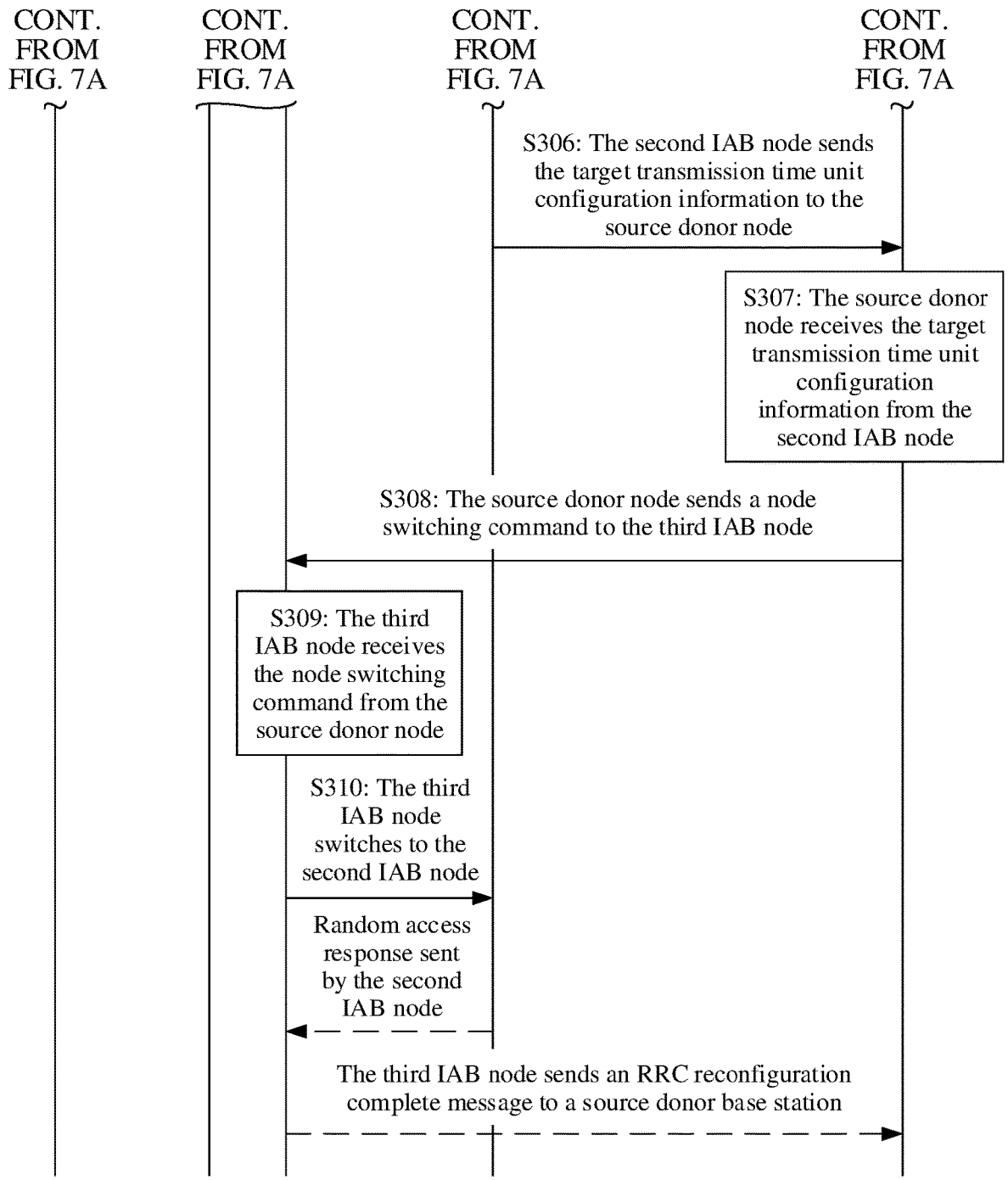

With reference to the intra-CU switching scenario shown in FIG. 4-1, as shown in FIG. 7A and FIG. 7B, in a third implementation, the IAB node switching method provided in the embodiments may include S301 to S310.

S301: A third IAB node sends a measurement report to a source donor node.

S302: The source donor node determines, based on the measurement report reported by the third IAB node, that IAB node switching needs to be performed.

For detailed descriptions of S301 and S302, refer to descriptions of S101 and S102 in the foregoing embodiment. Details are not described herein again.

S303: The source donor node sends source transmission time unit configuration information of the third IAB node to a second IAB.

In the embodiments, the source donor node may carry the source transmission time unit configuration information of the third IAB node in a UE context setup request message and send the UE context setup request message to the second IAB node. For details about the source transmission time unit configuration information of the third IAB node, refer to related descriptions of the source transmission time unit configuration information in the foregoing embodiments. Details are not described herein again.

Optionally, the UE context setup request message may further include IAB node indication information, and the IAB node indication information is used to indicate that a to-be-switched node is an IAB node.

For details about other content of S303, refer to the descriptions of S203 in the foregoing embodiment. Details are not described herein again.

S304: The second IAB node receives the source transmission time unit configuration information of the third IAB node from the source donor node.

S305: The second IAB node generates target transmission time unit configuration information of the third IAB node based on the source transmission time unit configuration information of the third IAB node.

In the embodiments, that the second IAB node generates the target transmission time unit configuration information based on the source transmission time unit configuration information includes: the second IAB node may use source transmission time unit configuration information of a link between the third IAB node and a child node of the third IAB node as target transmission time unit configuration information of the link between the third IAB node and the child node of the third IAB node; or target transmission time unit configuration information of a link between the third IAB node and a child node of the third IAB node may include source transmission time unit configuration information of the link between the third IAB node and the child node of the third IAB node; or target transmission time unit configuration information of a link between the third IAB node and a child node of the third IAB node may be a subset of source transmission time unit configuration information of the link between the third IAB node and the child node of the third IAB node. Therefore, communication between the third IAB node and the child node of the third IAB node is not affected.

S306: The second IAB node sends the target transmission time unit configuration information to the source donor node.

S307: The source donor node receives the target transmission time unit configuration information from the second IAB node.

S308: The source donor node sends a node switching command to the third IAB node.

The node switching command is used to indicate a parent node of the third IAB node to switch to the second IAB node, and the switching command includes the target transmission time unit configuration information received by the source donor node from the second IAB node.

S309: The third IAB node receives the node switching command from the source donor node.

S310: The third IAB node switches to the second IAB node.

For details about the process of switching from the third IAB node to the second IAB node, refer to related descriptions of S110 or S211 in the foregoing embodiments. Details are not described herein again.

Thus, the third implementation corresponding to the intra-CU switching scenario differs from the first implementation and the second implementation corresponding to the intra-CU switching scenario in that: In the process in which the third IAB node switches from the first IAB node to the second IAB node, the third IAB node is transparent to the child node of the third IAB node, that is, the third IAB node does not need to return to a UE mode, and does not need to suspend a DU of the third IAB node. Further, the third IAB node also does not need to send first indication information (correspondingly, the third IAB node also does not need to send second indication information) to the child node of the third IAB node. In this way, the third IAB node keeps communicating with the child node of the third IAB node without interruption.

Referring to the IAB node switching method described in S301 to S306, in a fourth implementation, when the source donor node determines that IAB node switching needs to be performed, the source donor node may generate the target transmission time unit configuration information based on the source transmission time unit configuration information of the third IAB node. Therefore, the source donor node separately sends the target transmission time unit configuration information to the second IAB node and the third IAB node, so that the third IAB node switches to the second IAB node. A difference between the fourth implementation and S301 to S306 lies in that the source donor node no longer sends the source transmission time unit configuration information of the third IAB node to the second IAB node, and the second IAB node does not need to generate the target transmission time unit configuration information, but the source donor node generates the target transmission time unit configuration information. A method procedure in the fourth implementation is not described in detail in the embodiments.

Figure 8A:
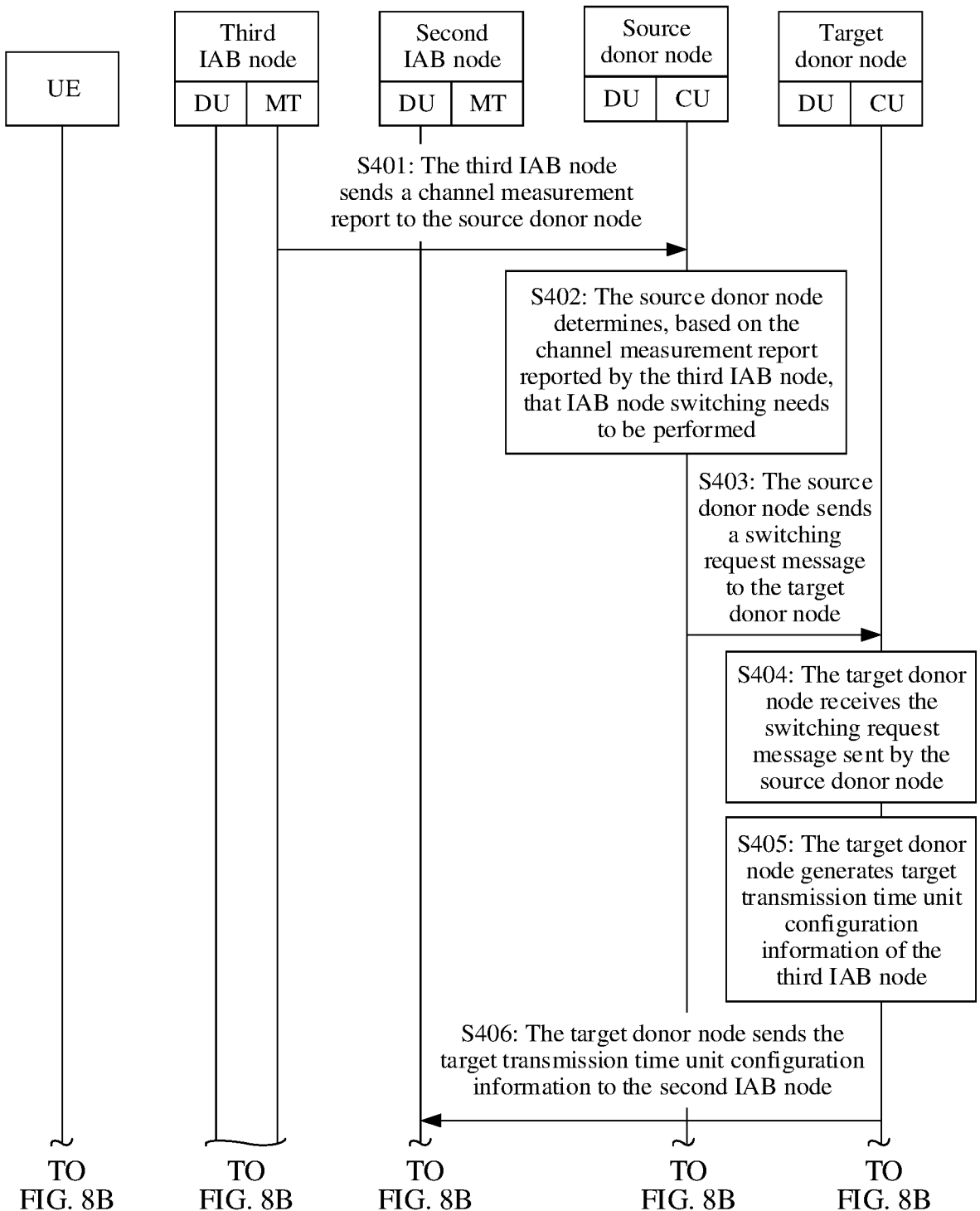
FIG. 8A to FIG. 8C are a fourth schematic diagram of an IAB node switching method according to an embodiment.
Figure 8B:
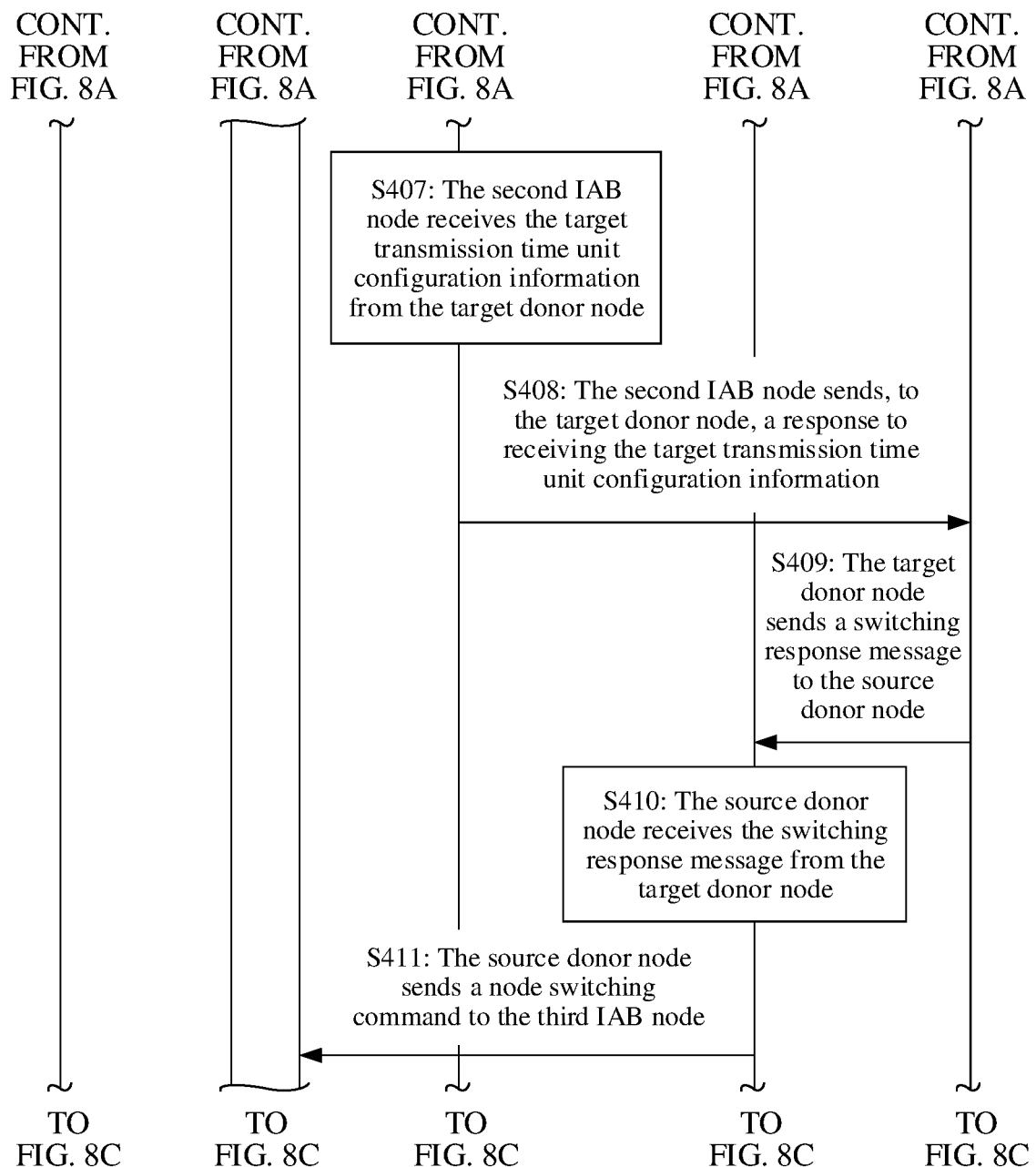
Figure 8C:
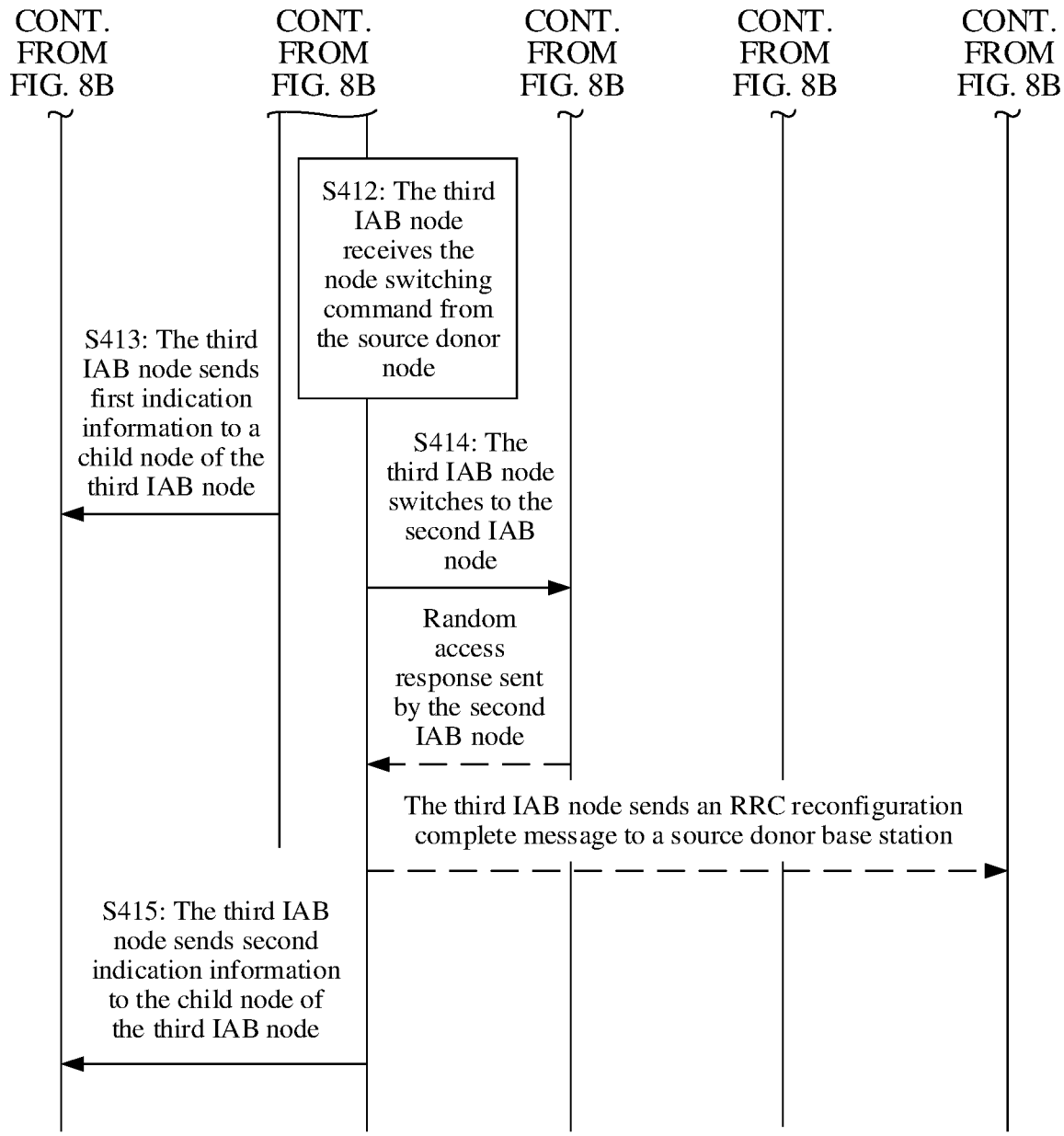

With reference to the inter-CU switching scenario shown in FIG. 4-2, as shown in FIG. 8A to FIG. 8C, in a first implementation, the IAB node switching method provided in the embodiments may include S401 to S415.

S401: A third IAB node sends a measurement report to a source donor node.

S402: The source donor node determines, based on the measurement report reported by the third IAB node, that IAB node switching needs to be performed.

For detailed descriptions of S401 and S402, refer to descriptions of S101 and S102 in the foregoing embodiment. Details are not described herein again.

S403: The source donor node sends a switching request message to a target donor node.

It should be understood that, that the source donor node sends a switching request message to a target donor node includes: a CU of the source donor node sends the switching request message to a CU of the target donor node.

In the embodiments, the switching request message is used to indicate to switch a parent node of the third IAB node to a second IAB node, and the switching request message carries at least one piece of the following information: source transmission time unit configuration information of the third IAB node or IAB node indication information. The source transmission time unit configuration information of the third IAB node includes at least one of the following: source transmission time unit configuration information of a link between a first IAB node and the third IAB node, source transmission time unit configuration information of a link between the third IAB node and a child node of the third IAB node, or source transmission time unit configuration information of a link between a first IAB node and the third IAB node and source transmission time unit configuration information of a link between the third IAB node and a child node of the third IAB node. The IAB node indication information is used to indicate that a to-be-switched node is an IAB node.

Optionally, in the embodiments, the source donor node determines that the parent node of the third IAB node needs to switch, and the source donor node may further determine a node to which the parent node of the third IAB node needs to switch (for example, switch to the second IAB node). In addition, the target donor node may determine a node to which the parent node of the third IAB node switches (for example, switches to the second IAB node). In this case, when the source donor node determines that the parent node of the third IAB node needs to switches, the source donor node may determine the target donor node based on the measurement report reported by the third IAB node, and send the measurement report reported by the third IAB node to the target donor node. Further, the target donor node determines, based on the measurement report reported by the third IAB node, to switch the parent node of the third IAB node to the second IAB node.

S404: The target donor node receives the switching request message sent by the source donor node.

It should be understood that, that the target donor node receives the switching request message sent by the source donor node includes: the CU of the target donor node receives the switching request message sent by the CU of the source donor node.

S405: The target donor node generates target transmission time unit configuration information of the third IAB node.

It should be understood that, that the target donor node generates target transmission time unit configuration information of the third IAB node includes: the CU of the target donor node generates the target transmission time unit configuration information of the third IAB node.

The target transmission time unit configuration information may include at least one of the following: target transmission time unit configuration information of a link between the second IAB node and the third IAB node, target transmission time unit configuration information of the link between the third IAB node and the child node of the third IAB node, or target transmission time unit configuration information of a link between the second IAB node and the third IAB node and target transmission time unit configuration information of the link between the third IAB node and the child node of the third IAB node.

Similar to S205, in a possible implementation, the target donor node may generate the target transmission time unit configuration information based on the source transmission time unit configuration information received from the source donor node. In another possible implementation, the target donor node may directly generate new transmission time unit configuration information (that is, the target transmission time unit configuration information) without considering the source transmission time unit configuration information. The new transmission time unit configuration information may be completely different from or partially different from the source transmission time unit configuration information.

S406: The target donor node sends the target transmission time unit configuration information to the second IAB node.

It should be understood that, that the target donor node sends the target transmission time unit configuration information to the second IAB node includes: the CU of the target donor node sends the target transmission time unit configuration information to a DU of the second IAB node. Optionally, in the embodiments, the target donor node may carry the target transmission time unit configuration information in a UE context setup request message. For example, the UE context setup request message may be an F1AP message.

Optionally, that the target donor node sends the target transmission time unit configuration information to the second IAB node may alternatively be: the CU of the target donor node sends the target transmission time unit configuration information to an MT of the second IAB node, that is, the target transmission time unit configuration information is carried by using an RRC message.

S407: The second IAB node receives the target transmission time unit configuration information from the target donor node.

It should be understood that, that the second IAB node receives the target transmission time unit configuration information from the target donor node includes: the DU of the second IAB node receives the target transmission time unit configuration information from the CU of the target donor node. Alternatively, the MT of the second IAB node receives the target transmission time unit configuration information from the CU of the target donor node, and then the MT of the second IAB node sends the target transmission time unit configuration information to the DU of the second IAB node through an internal interface.

S408: The second IAB node sends, to the target donor node, a response to receiving the target transmission time unit configuration information.

It should be understood that the second IAB node may respond to receiving the target transmission time unit configuration information sent by the target donor node by sending a UE context setup response message (the response message is an F1AP message). That the second IAB node sends a UE context setup complete message to the target donor node includes: the DU of the second IAB node sends the UE context setup complete message to the CU of the target donor node.

Optionally, the second IAB node may further send an RRC message to respond to receiving the target transmission time unit configuration information sent by the target donor node. For example, the MT of the second IAB node sends the RRC message to the CU of the source donor node as a response.

S409: The target donor node sends a switching response message to the source donor node.

It should be understood that, that the target donor node sends a switching response message to the source donor node includes: the CU of the target donor node sends the switching response message to the CU of the source donor node.

The switching response message includes the target transmission time unit configuration information of a third node.

S410: The source donor node receives the switching response message from the target donor node.

It should be understood that, that the source donor node receives the switching response message from the target donor node includes: the CU of the source donor node receives the switching response message from the CU of the target donor node.

S411: The source donor node sends a node switching command to the third IAB node.

The node switching command is used to indicate the parent node of the third IAB node to switch to the second node, and the node switching command includes the target transmission time unit configuration information received by the source donor node from the target donor node.

S412: The third IAB node receives the node switching command from the source donor node.

S413: The third IAB node sends first indication information to the child node of the third IAB node.

S414: The third IAB node switches to the second IAB node.

S415: The third IAB node sends second indication information to the child node of the third IAB node.

For detailed descriptions of S411 to S415, refer to descriptions of S107 to S111 in the foregoing embodiment. Details are not described herein again.

In the embodiments, similar to the first indication information and the second indication information in S109 and S111, the first indication information and the second indication information herein may be explicit indication information or may be implicit indication information. This is not limited in the embodiments.

In the embodiments, the third IAB node may carry the first indication information and/or the second indication information in an RRC message, an F1AP message, a MAC CE, or PDCCH DCI, and send the first indication information and/or the second indication information to the child node of the third IAB node. This is not limited in the embodiments.

Thus, in the first implementation corresponding to the inter-CU switching scenario, the target transmission time unit configuration information is generated by the target donor node, and then the target donor node separately sends the target transmission time unit configuration information to the second IAB node and the source donor node, and then the source donor node sends the target transmission time unit configuration information to a third IAB node, so that the third IAB node switches to the second IAB node.

Figure 9A:
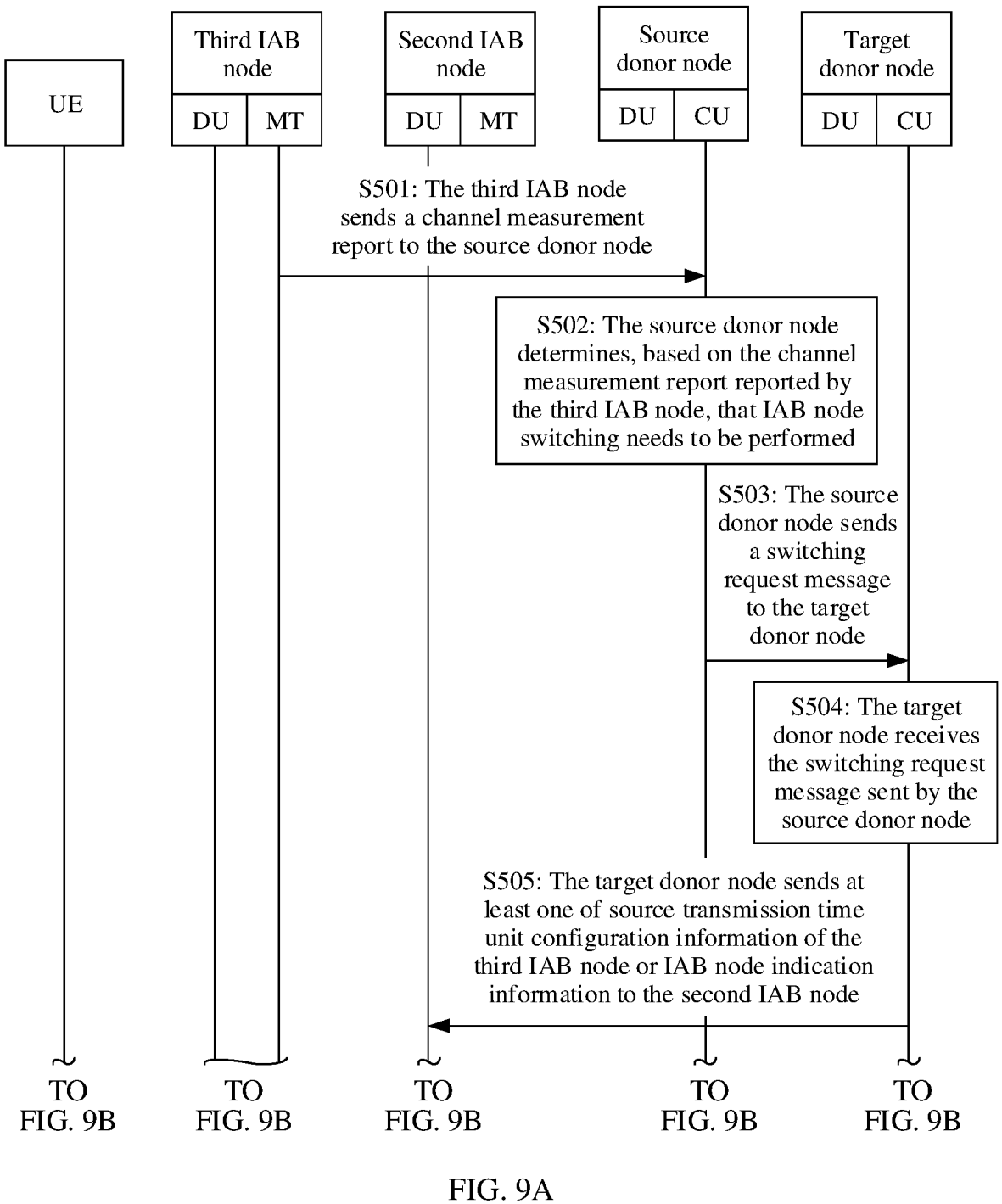
FIG. 9A to FIG. 9C are a fifth schematic diagram of an IAB node switching method according to an embodiment.
Figure 9B:
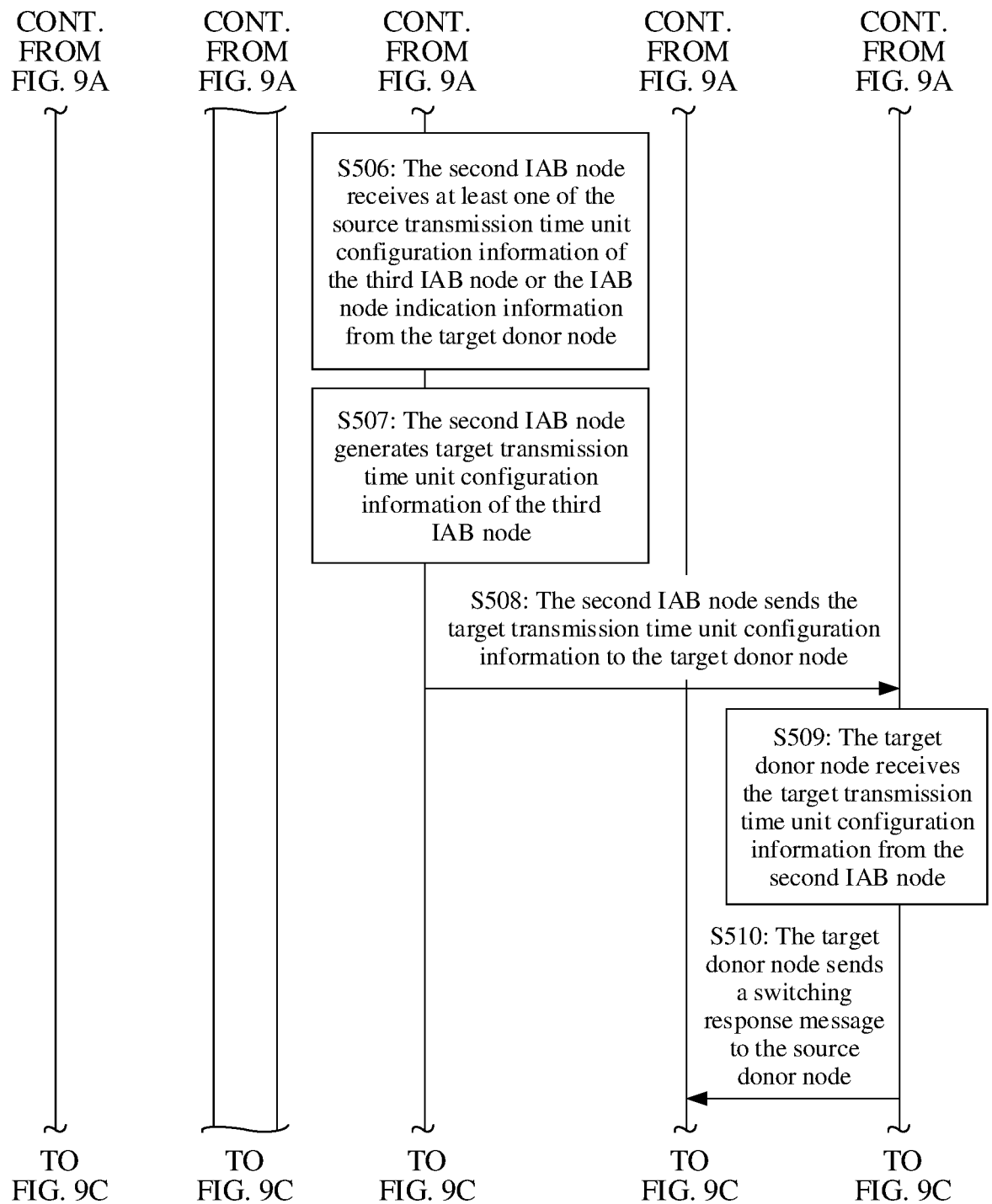
Figure 9C:
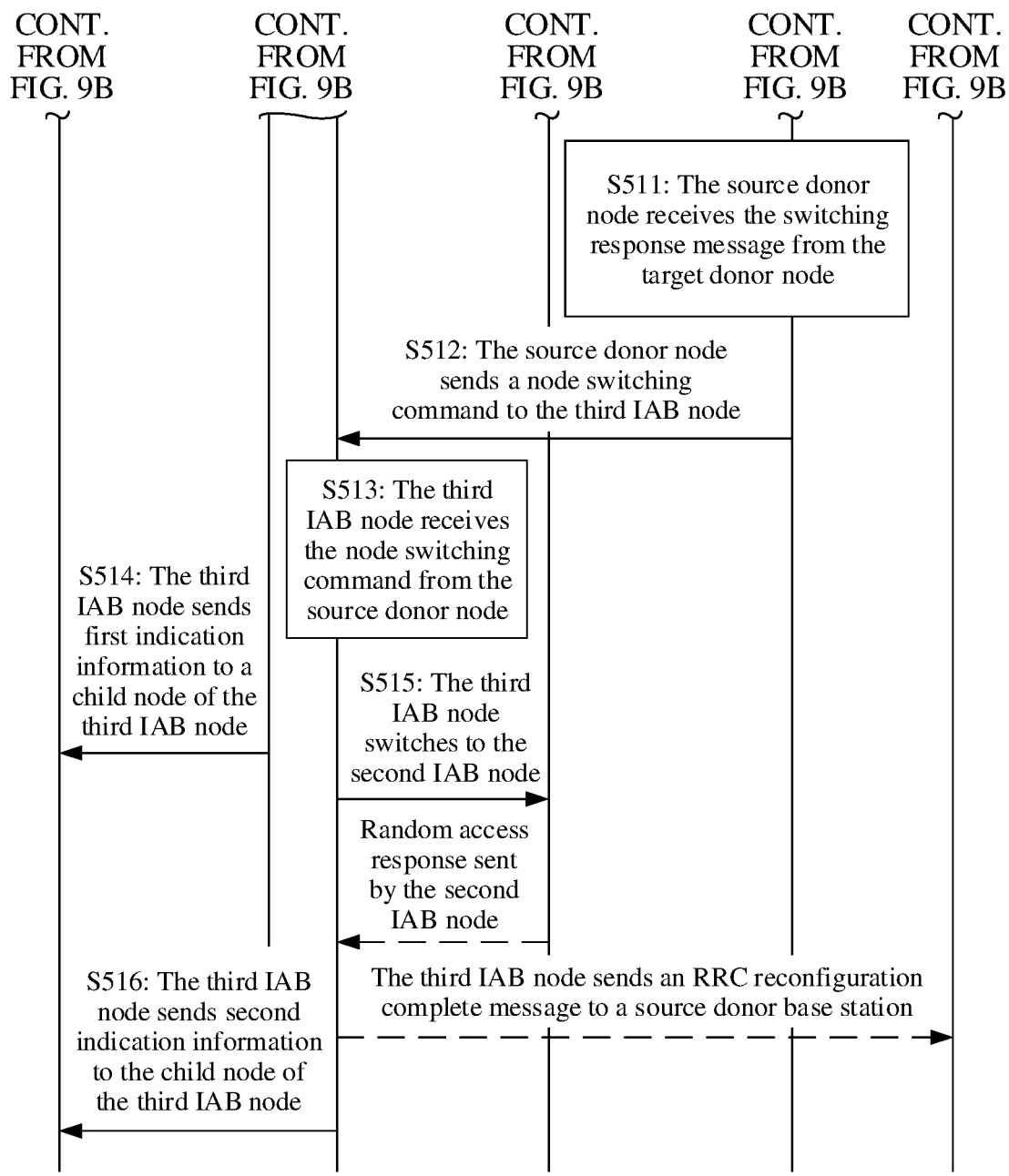

With reference to the inter-CU switching scenario shown in FIG. 4-2, as shown in FIG. 9A to FIG. 9C, in a second implementation, the IAB node switching method provided in the embodiments may include S501 to S516.

S501: A third IAB node sends a measurement report to a source donor node.

S502: The source donor node determines, based on the measurement report reported by the third IAB node, that IAB node switching needs to be performed.

For detailed descriptions of S501 and S502, refer to descriptions of S101 and S102 in the foregoing embodiment. Details are not described herein again.

S503: The source donor node sends a switching request message to a target donor node.

S504: The target donor node receives the switching request message sent by the source donor node.

For detailed descriptions of S503 and S504, refer to related descriptions of S403 and S404 in the foregoing embodiment. Details are not described herein again.

S505: The target donor node sends at least one of source transmission time unit configuration information of the third IAB node or IAB node indication information to a second IAB node.

It should be understood that the target donor node sends at least one of source transmission time unit configuration information of the third IAB node or IAB node indication information to a second IAB node includes: a CU of the target donor node sends at least one of the source transmission time unit configuration information of the third IAB node or the IAB node indication information to a DU of the second IAB node.

Optionally, in the embodiments, the target donor node may carry at least one of the source transmission time unit configuration information of the third IAB node or the IAB node indication information in a UE context setup request message.

Optionally, the CU of the target donor node may alternatively send the source transmission time unit configuration information of the third IAB node to an MT of the second IAB node, and then the MT of the second IAB node sends the source transmission time unit configuration information of the third IAB node to the DU of the second IAB node through an internal interface.

S506: The second IAB node receives at least one of the source transmission time unit configuration information of the third IAB node or the IAB node indication information from the target donor node.

It should be understood that, that the second IAB node receives at least one of the source transmission time unit configuration information of the third IAB node or the IAB node indication information from the target donor node includes: the DU of the second IAB node receives at least one of the source transmission time unit configuration information of the third IAB node or the IAB node indication information from the CU of the target donor node.

S507: The second IAB node generates target transmission time unit configuration information of the third IAB node.

It should be understood that, that the second IAB node generates target transmission time unit configuration information of the third IAB node includes: the DU of the second IAB node generates the target transmission time unit configuration information of the third IAB node.

It should be noted that the method for generating the target transmission time unit configuration information by the second IAB node is similar to the foregoing method for generating the target transmission time unit by the target donor node. Other descriptions about generating the target transmission time unit configuration information by the second IAB node refer to related descriptions of S405 in the foregoing embodiment. Details are not described herein again.

S508: The second IAB node sends the target transmission time unit configuration information to the target donor node.

It should be understood that, that the second IAB node sends the target transmission time unit configuration information to the target donor node includes: the DU of the second IAB node sends the target transmission time unit configuration information to the CU of the target donor node.

S509: The target donor node receives the target transmission time unit configuration information from the second IAB node.

It should be understood that, that the target donor node receives the target transmission time unit configuration information from the second IAB node includes: the CU of the target donor node receives the target transmission time unit configuration information from the DU of the second IAB node.

S510: The target donor node sends a switching response message to the source donor node.

The switching response message includes the target transmission time unit configuration information received by the target donor node from the second IAB node.

S511: The source donor node receives the switching response message from the target donor node.

For detailed descriptions of S510 and S511, refer to related descriptions of S409 and S410 in the foregoing embodiment. Details are not described herein again.

S512: The source donor node sends a node switching command to the third IAB node.

The node switching command is used to indicate a parent node of the third IAB node to switch to the second node, and the node switching command includes the target transmission time unit configuration information received by the source donor node from the target donor node.

S513: The third IAB node receives the node switching command from the source donor node.

S514: The third IAB node sends first indication information to the child node of the third IAB node.

S515: The third IAB node switches to the second IAB node.

S516: The third IAB node sends second indication information to the child node of the third IAB node.

For detailed descriptions of S512 to S516, refer to descriptions of S107 to S111 in the foregoing embodiment. Details are not described herein again.

In the embodiments, similar to the first indication information and the second indication information in S109 and S111, the first indication information and the second indication information herein may be explicit indication information or may be implicit indication information. This is not limited in the embodiments.

In the embodiments, the third IAB node may carry the first indication information and/or the second indication information in an RRC message, an F1AP message, a MAC CE, or PDCCH DCI, and send the first indication information and/or the second indication information to the child node of the third IAB node. This is not limited in the embodiments.

Therefore, the second implementation corresponding to the inter-CU switching scenario differs from the first implementation corresponding to the inter-CU switching scenario in that: the target transmission time unit configuration information of the third IAB node is generated by the second IAB node. The second IAB node sends the target transmission time unit configuration information to the target donor node. Then, the target donor node sends the target transmission time unit configuration information to the source donor node, the source donor node sends the target transmission time unit configuration information to the third IAB node, and the third IAB node switches to the second IAB node.

Figure 10A:
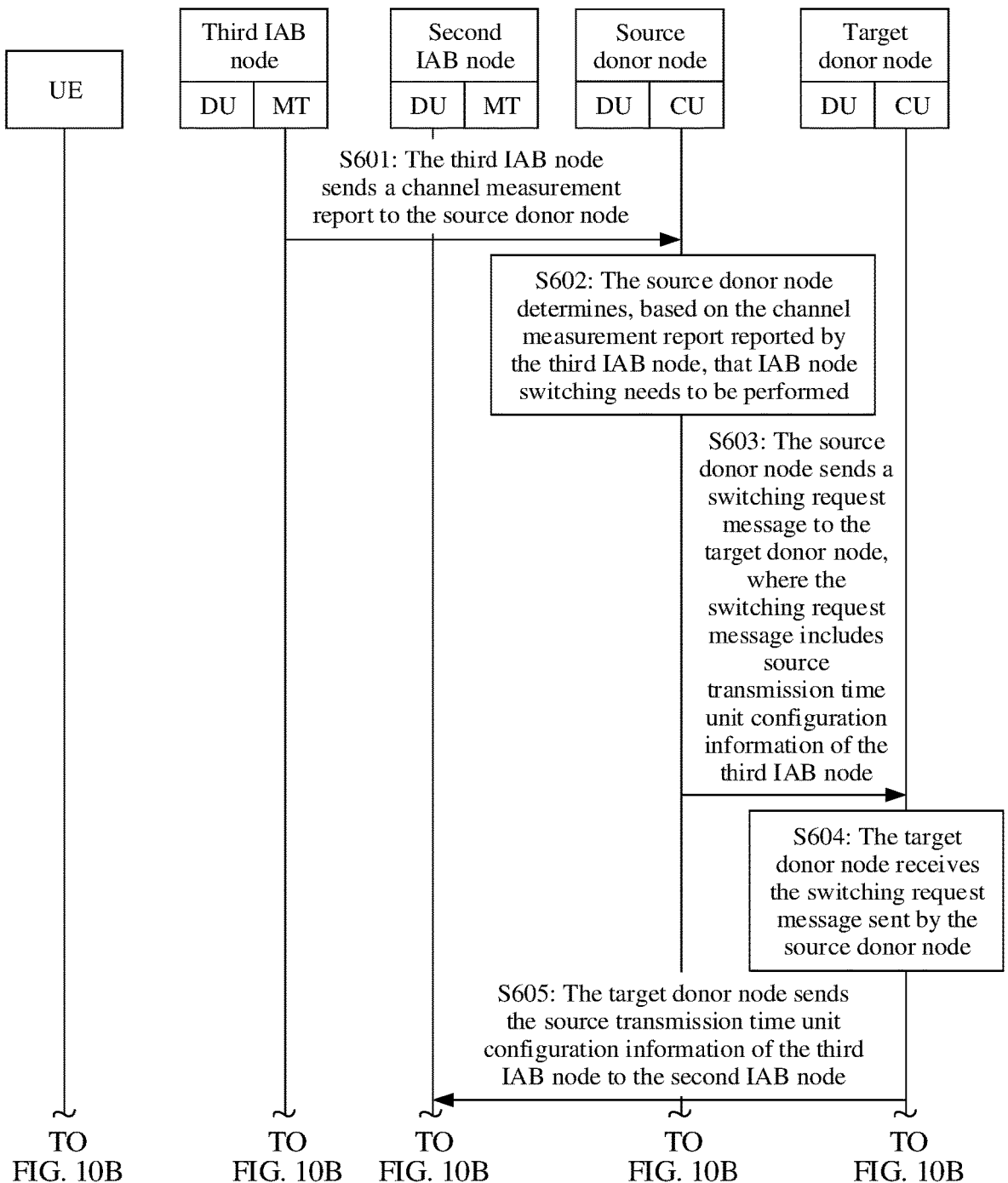
FIG. 10A to FIG. 10C are a sixth schematic diagram of an IAB node switching method according to an embodiment.
Figure 10B:
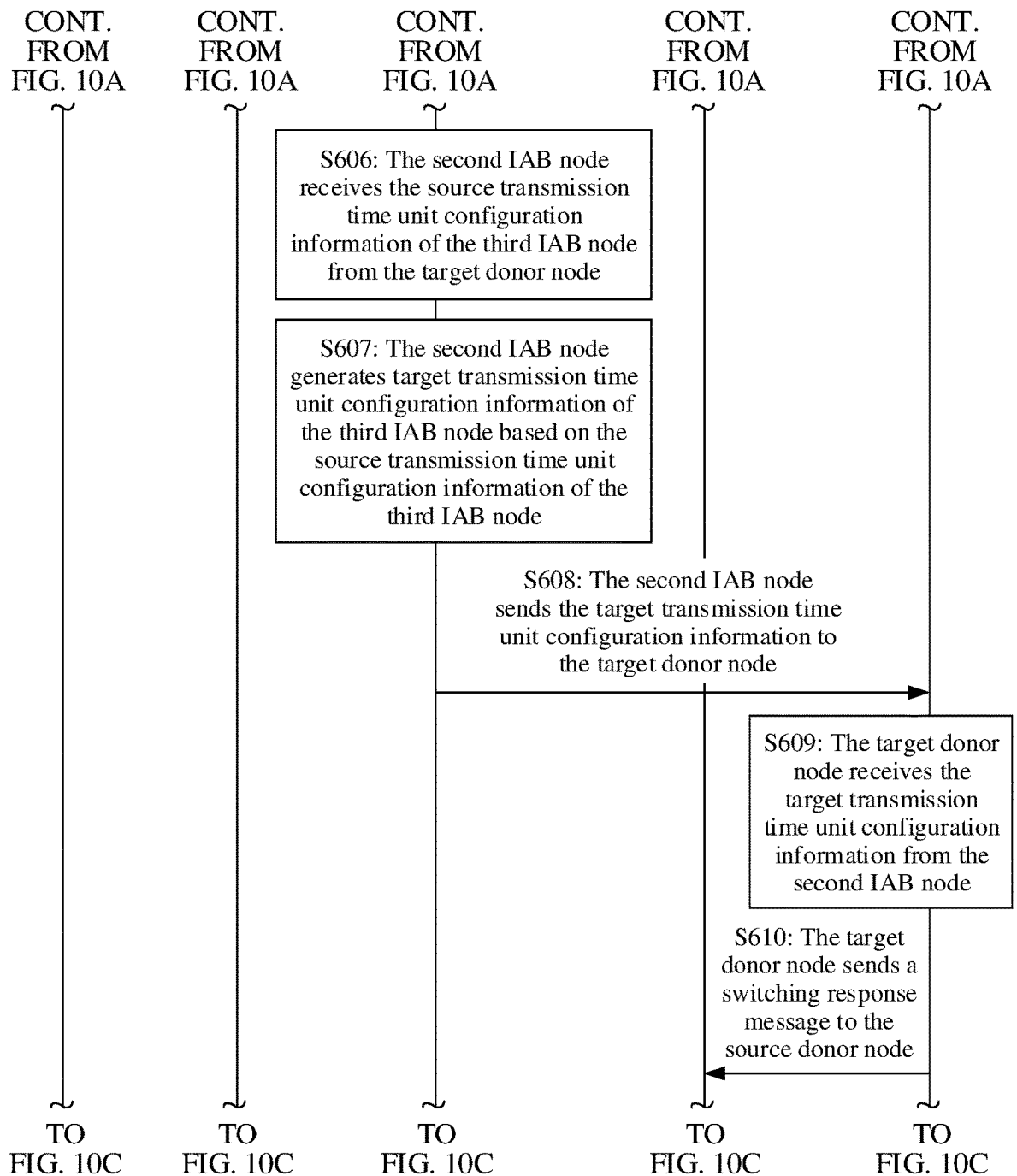
Figure 10C:
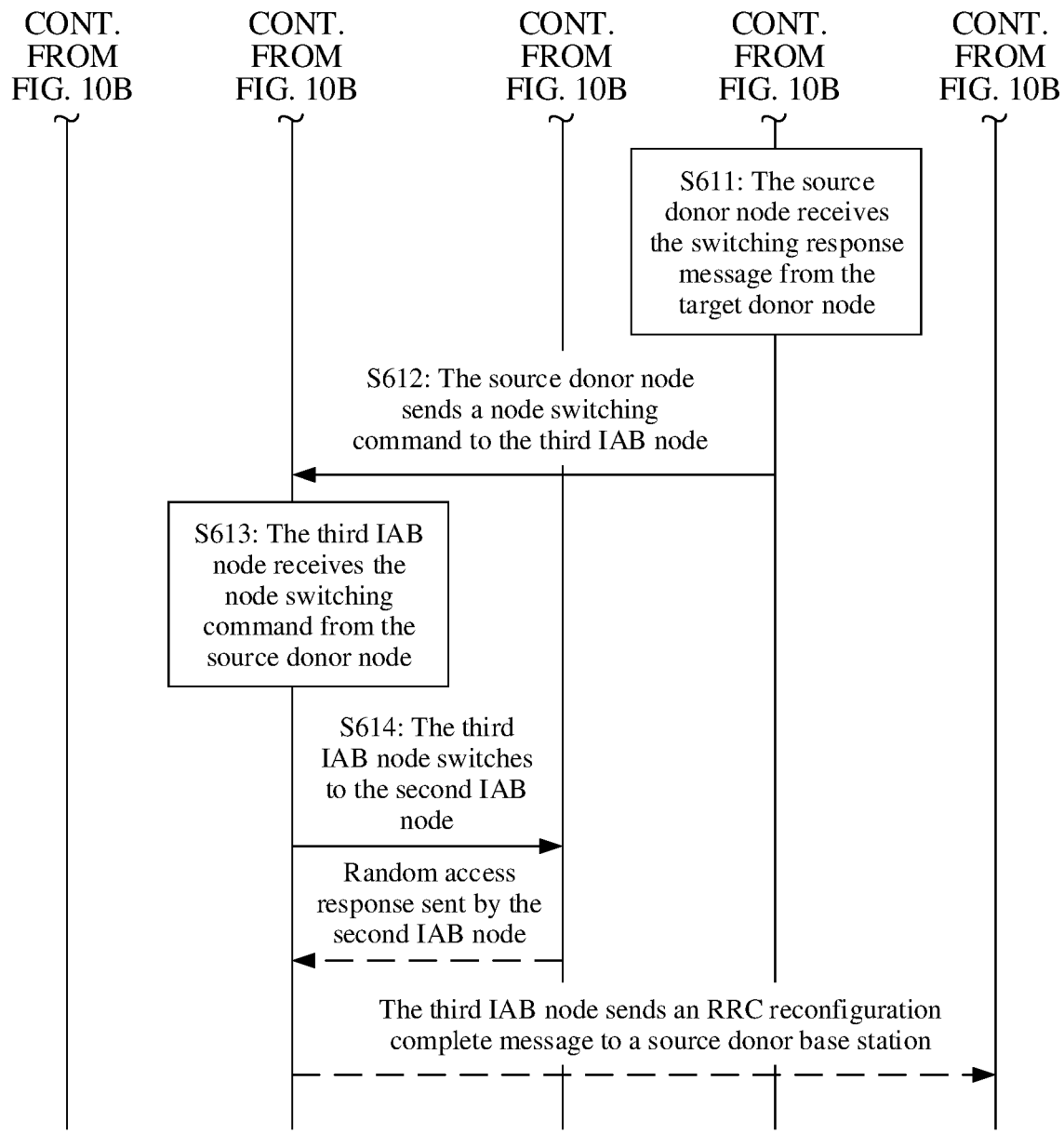

With reference to the inter-CU switching scenario shown in FIG. 4-2, as shown in FIG. 10A to FIG. 10C, in a third implementation, the IAB node switching method provided in the embodiments may include S601 to S614.

S601: A third IAB node sends a measurement report to a source donor node.

S602: The source donor node determines, based on the measurement report reported by the third IAB node, that IAB node switching needs to be performed.

For detailed descriptions of S601 and S602, refer to descriptions of S101 and S102 in the foregoing embodiment. Details are not described herein again.

S603: The source donor node sends a switching request message to a target donor node, where the switching request message includes source transmission time unit configuration information of the third IAB node.

For detailed descriptions of the source transmission time unit configuration information of the third IAB node, refer to related descriptions of the source transmission time unit configuration information in the foregoing embodiment. Details are not described herein again.

Optionally, the switching request message may further include IAB node indication information, and the IAB node indication information is used to indicate that a to-be-switched node is an IAB node.

S604: The target donor node receives the switching request message sent by the source donor node.

For details about other content of S603 and S604, refer to related descriptions of S403 and S404 in the foregoing embodiment. Details are not described herein again.

S605: The target donor node sends the source transmission time unit configuration information of the third IAB node to the second IAB node.

It should be understood that, that the target donor node sends the source transmission time unit configuration information of the third IAB node to the second IAB node includes: a CU of the target donor node sends the source transmission time unit configuration information of the third IAB node to a DU of the second IAB node.

In the embodiments, the target donor node may carry the source transmission time unit configuration information of the third IAB node in a UE context setup request message and send the UE context setup request message to the second IAB node. Optionally, the IAB node indication information may be further carried in the UE context setup request message and send the UE context setup request message to the second IAB node.

Optionally, the CU of the target donor node may alternatively send the source transmission time unit configuration information of the third IAB node to an MT of the second IAB node, and then the MT of the second node sends the source transmission time unit configuration information of the third IAB node to the DU of the second node through an internal interface.

S606: The second IAB node receives the source transmission time unit configuration information of the third IAB node from the target donor node.

It should be understood that, that the second IAB node receives the source transmission time unit configuration information of the third IAB node from the target donor node includes: the DU of the second IAB node receives the source transmission time unit configuration information of the third IAB node from the CU of the target donor node.

That the second IAB node receives at least one of the source transmission time unit configuration information of the third IAB node or the IAB node indication information from the target donor node includes: the DU of the second IAB node receives at least one of the source transmission time unit configuration information of the third IAB node or the IAB node indication information from the CU of the target donor node.

S607: The second IAB node generates target transmission time unit configuration information of the third IAB node based on the source transmission time unit configuration information of the third IAB node.

It should be understood that, that the second IAB node generates target transmission time unit configuration information of the third IAB node based on the source transmission time unit configuration information of the third IAB node includes: the DU of the second IAB node generates the target transmission time of the third IAB node based on the source transmission time unit configuration information of the third IAB node.

In the embodiments, that the second IAB node generates the target transmission time unit configuration information based on the source transmission time unit configuration information includes: the second IAB node may use source transmission time unit configuration information of a link between the third IAB node and a child node of the third IAB node as target transmission time unit configuration information of the link between the third IAB node and the child node of the third IAB node; or target transmission time unit configuration information of a link between the third IAB node and a child node of the third IAB node may include source transmission time unit configuration information of the link between the third IAB node and the child node of the third IAB node; or target transmission time unit configuration information of a link between the third IAB node and a child node of the third IAB node may be a subset of source transmission time unit configuration information of the link between the third IAB node and the child node of the third IAB node. Therefore, communication between the third IAB node and the child node of the third IAB node is not affected.

S608: The second IAB node sends the target transmission time unit configuration information to the target donor node.

S609: The target donor node receives the target transmission time unit configuration information from the second IAB node.

S610: The target donor node sends a switching response message to the source donor node.

The switching response message includes the target transmission time unit configuration information received by the target donor node from the second IAB node.

S611: The source donor node receives the switching response message from the target donor node.

The switching response message includes the target transmission time unit configuration information of the third IAB node.

S612: The source donor node sends a node switching command to the third IAB node.

The node switching command is used to indicate a parent node of the third IAB node to switch to the second node, and the node switching command includes the target transmission time unit configuration information received by the source donor node from the target donor node.

S613: The third IAB node receives the node switching command from the source donor node.

For detailed descriptions of S608 to S613, refer to related descriptions of S508 to S513 in the foregoing embodiment. Details are not described herein again.

S614: The third IAB node switches to the second IAB node.

For detailed descriptions of S614, refer to related descriptions in the foregoing embodiments. Details are not described herein again.

Thus, the third implementation corresponding to the inter-CU switching scenario differs from the first implementation and the second implementation corresponding to the inter-CU switching scenario in that: in the process in which the third IAB node switches from the first IAB node to the second IAB node, the third IAB node is transparent to the child node of the third IAB node, that is, the third IAB node does not need to return to a UE mode, and does not need to suspend a DU of the third IAB node. Further, the third IAB node also does not need to send first indication information (correspondingly, the third IAB node also does not need to send second indication information) to the child node of the third IAB node. In this way, the third IAB node keeps communicating with the child node of the third IAB node without interruption.

Referring to the IAB node switching method described in S601 to S614, in a fourth implementation, when the source donor node determines that IAB node switching needs to be performed, the source donor node sends the switching request message to the target donor node (the switching request message includes the source transmission time unit configuration information of the third IAB node). Then, the target donor node may generate the target transmission time unit configuration information based on the source transmission time unit configuration information of the third IAB node, and separately send the target transmission time unit configuration information to the second IAB node and the source donor node. Then, the source donor node sends the target transmission time unit configuration information to the third IAB node, and then the third IAB node switches to the second IAB node. A difference between the fourth implementation and S601 to S614 lies in that the target donor node no longer sends the source transmission time unit configuration information of the third IAB node to the second IAB node, and the second IAB node does not need to generate the target transmission time unit configuration information, but the target donor node generates the target transmission time unit configuration information. A method procedure in the fourth implementation is not described in detail in the embodiments.

According to the IAB node switching method and apparatus provided in the embodiments, in the process in which the parent node of the third IAB node switches from the first IAB node to the second IAB node, the source donor node, the target donor node, or the second IAB node may generate the target transmission time unit configuration information of the third IAB node, and the third IAB node may send the first indication information to the child node of the third IAB node, to indicate the child node of the third IAB node to interrupt transmission with the third IAB node. In this way, the parent node of the third IAB node successfully completes switching.

The foregoing mainly describes the solutions of the embodiments from a perspective of interaction between nodes. It may be understood that, to implement the foregoing functions, each node, such as the target donor node or the third IAB node, includes a corresponding hardware structure and/or software module for performing each function. A person of ordinary skill in the art should be easily aware that, in combination with units and algorithm steps of the examples described in the embodiments, the embodiments may be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope.

In the embodiments, functional module division may be performed on the target donor node, the third IAB node, and the like based on the foregoing method examples. For example, each functional module corresponding to each function may be obtained through division, or two or more functions may be integrated into one processing module. The integrated module may be implemented in a form of hardware or may be implemented in a form of a software functional module. It should be noted that, in the embodiments, division into modules is an example, and is merely logical function division. During actual implementation, there may be another division manner.

Figure 11:
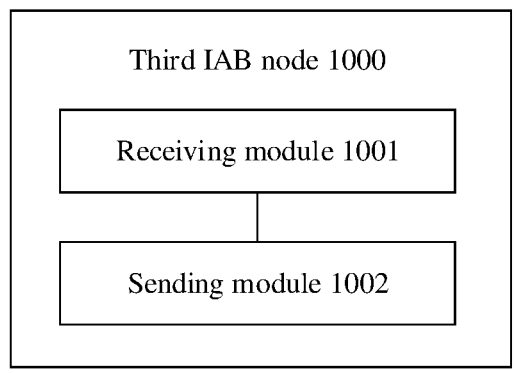
FIG. 11 is a first schematic structural diagram of a third IAB node according to an embodiment.

When each functional module is obtained through division corresponding to each function, FIG. 11 is a possible schematic structural diagram of the third IAB node in the foregoing embodiments. As shown in FIG. 11, a third IAB node 1000 may include a receiving module 1001 and a sending module 1002. The receiving module 1001 may be configured to support the third IAB node 1000 in performing S108, S209, S309, S412, S513, and S613 in the foregoing method embodiments. The sending module 1002 may be configured to support the third IAB node 1000 in performing S101, S109, S110, S111, S201, S210, S211, S212, S301, S310, S401, S413, S415, S501, S514, S515, S516, S601, and S614 in the foregoing method embodiments. All related content of the steps in the foregoing method embodiments may be cited in function descriptions of corresponding functional modules. Details are not described herein again.

Figure 12:
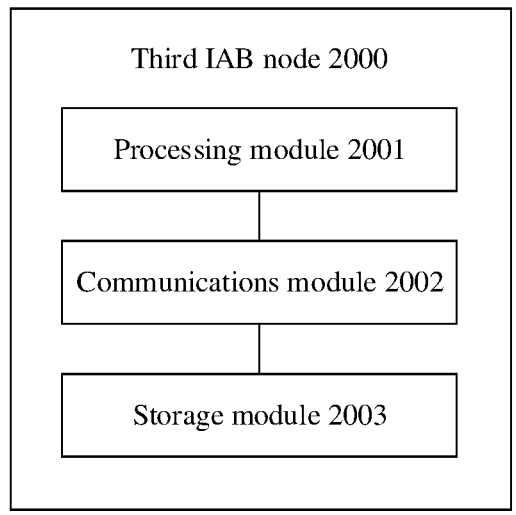
FIG. 12 is a second schematic structural diagram of a third IAB node according to an embodiment.

When an integrated unit is used, FIG. 12 is a possible schematic structural diagram of the third IAB node in the foregoing embodiments. As shown in FIG. 12, a third IAB node 2000 may include a processing module 2001 and a communications module 2002. The processing module 2001 may be configured to control and manage actions of the third IAB node 2000. The communications module 2002 may be configured to support the third IAB node 2000 in communicating with another network entity. For example, the communications module 2002 may be configured to support the third IAB node 2000 in performing S101, S108, S109, S110, S111, S201, S209, S210, S211, S212, S301, S309, S310, S401, S412, S413, S415, S501, S513, S514, S515, S516, S601, S613, and S614 in the foregoing method embodiments. Optionally, as shown in FIG. 12, the third IAB node 2000 may further include a storage module 2003, configured to store program code and data of the third IAB node 2000.

The processing module 2001 may be a processor or a controller, such as a central processing unit (CPU), a general-purpose processor, a digital signal processor (DSP), an application-specific integrated circuit (ASIC), a field programmable gate array (FPGA), or another programmable logic component, a transistor logic component, a hardware component, or a combination thereof. The processor may implement or execute various example logical blocks, modules, and circuits described with reference to content in the embodiments. The processor may alternatively be a combination of processors implementing a computing function, for example, a combination of one or more microprocessors, or a combination of a DSP and a microprocessor. The communications module 2002 may be a transceiver, a transceiver circuit, a communications interface, or the like. The storage module 2003 may be a memory.

When the processing module 2001 is the processor, the communications module 2002 is the transceiver, and the storage module 2003 is the memory, the processor, the transceiver, and the memory may be connected through a bus. The bus may be a peripheral component interconnect (PCI) bus, an extended industry standard architecture (EISA) bus, or the like. The bus may be classified into an address bus, a data bus, a control bus, and the like.

Figure 13:
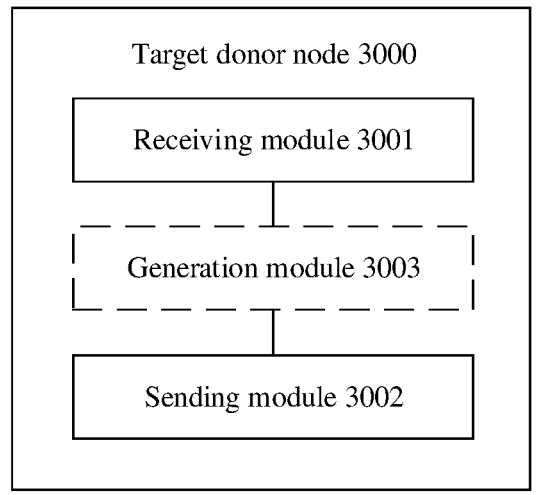
FIG. 13 is a first schematic structural diagram of a target donor node according to an embodiment.

When each functional module is obtained through division corresponding to each function, FIG. 13 is a possible schematic structural diagram of the target donor node in the foregoing embodiments. As shown in FIG. 13, a target donor node 3000 may include a receiving module 3001 and a sending module 3002. The receiving module 3001 may be configured to support the target donor node 3000 in performing S404, S504, S509, S604, and S609 in the foregoing method embodiments. The sending module 3002 may be configured to support the target donor node 3000 in performing S406, S409, S505, S510, S605, and S610 in the foregoing method embodiments. Optionally, as shown in FIG. 13, the target donor node 3000 may further include a generation module 3003, and the generation module 3003 may be configured to support the target donor node 3000 in performing S405 in the foregoing method embodiment. All related content of the steps in the foregoing method embodiments may be cited in function descriptions of corresponding functional modules. Details are not described herein again.

Figure 14:
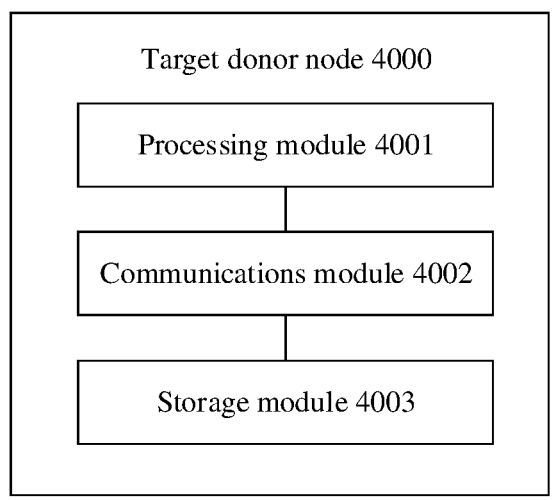
FIG. 14 is a second schematic structural diagram of a target donor node according to an embodiment.

When an integrated unit is used, FIG. 14 is a possible schematic structural diagram of the target donor node in the foregoing embodiments. As shown in FIG. 14, a target donor node 4000 may include a processing module 4001 and a communications module 4002. The processing module 4001 may be configured to control and manage actions of the target donor node 4000. For example, the processing module 4001 may be configured to support the target donor node 4000 in performing S405 in the foregoing method embodiment. The communications module 4002 may be configured to support the target donor node 4000 in communicating with another network entity. For example, the communications module 4002 may be configured to support the target donor node 4000 in performing S404, S406, S409, S504, S505, S509, S510, S604, S605, S609, and S610 in the foregoing method embodiments. Optionally, as shown in FIG. 14, the target donor node 4000 may further include a storage module 4003, configured to store program code and data of the target donor node 4000.

The processing module 4001 may be a processor or a controller, for example, may be a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content in the embodiments. The processor may alternatively be a combination of processors implementing a computing function, for example, a combination of one or more microprocessors, or a combination of a DSP and a microprocessor. The communications module 4002 may be a transceiver, a transceiver circuit, a communications interface, or the like. The storage module 4003 may be a memory.

When the processing module 4001 is the processor, the communications module 4002 is the transceiver, and the storage module 4003 is the memory, the processor, the transceiver, and the memory may be connected through a bus. The bus may be a PCI bus, an EISA bus, or the like. The bus may be classified into an address bus, a data bus, a control bus, and the like.

When each functional module is obtained through division corresponding to each function, an embodiment provides a source donor node. The source donor node may include a determining module, a generation module, a sending module, and a receiving module. The determining module may be configured to support the source donor node in performing S102, S202, S302, S402, S502, and S602 in the foregoing method embodiments. The generation module may be configured to support the source donor node in performing S103 in the foregoing method embodiment. The sending module may be configured to support the source donor node in performing S104, S107, S203, S208, S303, S308, S403, S411, S503, S512, S603, and S612 in the foregoing method embodiments. The receiving module may be configured to support the source donor node in performing S207, S307, S410, S511, and S611 in the foregoing method embodiments. All related content of the steps in the foregoing method embodiments may be cited in function descriptions of corresponding functional modules. Details are not described herein again.

When an integrated unit is used, an embodiment provides a source donor node. The source donor node may include a processing module and a communications module. The processing module may be configured to control and manage actions of the source donor node. For example, the processing module may be configured to support the source donor node in performing S102, S103, S202, S302, S402, and S502, and S602 and S103 in the foregoing method embodiments. The communications module may be configured to support communication between the source donor node and another network entity. For example, the communications module may be configured to support the source donor node in performing S104, S107, S203, S207, S208, S303, S307, S308, S403, S410, S411, S503, S511, S512, S603, S611, and S612 in the foregoing method embodiments. Optionally, the source donor node may further include a storage module, configured to store program code and data of the source donor node.

The processing module of the source donor IAB node may be a processor or a controller, for example, may be a CPU, a general purpose processor, a DSP, an ASIC, an FPGA or another programmable logic device, a transistor logic device, a hardware component, or any combination thereof. The processor may implement or execute various example logical blocks, modules, and circuits described with reference to content in the embodiments. The processor may alternatively be a combination of processors implementing a computing function, for example, a combination of one or more microprocessors, or a combination of a DSP and a microprocessor. The communications module of the source donor IAB node may be a transceiver, a transceiver circuit, a communications interface, or the like. The storage module of the source donor IAB node may be a memory.

When the processing module is the processor, the communications module is the transceiver, and the storage module is the memory, the processor, the transceiver, and the memory may be connected through a bus. The bus may be a PCI bus, an EISA bus, or the like. The bus may be classified into an address bus, a data bus, a control bus, and the like.

When each functional module is obtained through division corresponding to each function, an embodiment provides a second IAB node. The second IAB node may include a receiving module, a sending module, and a generation module. The receiving module may be configured to support the second IAB node in performing S105, S204, S304, S407, S506, and S606 in the foregoing method embodiments. The sending module may be configured to support the second IAB node in performing S106, S206, S306, S408, S508, and S608 in the foregoing method embodiments. The generation module may be configured to support the second IAB node in performing S205, S305, S507, and S607 in the foregoing method embodiments. All related content of the steps in the foregoing method embodiments may be cited in function descriptions of corresponding functional modules. Details are not described herein again.

When an integrated unit is used, an embodiment provides a second IAB node. The second IAB node may include a processing module and a communications module. The processing module may be configured to control and manage actions of the second IAB node. For example, the processing module may be configured to support the second IAB node in performing S205, S305, S507, and S607 in the foregoing method embodiments. The communications module may be configured to support communication between the second IAB node and another network entity. For example, the communications module may be configured to support the second IAB node in performing S105, S106, S204, S206, S304, S306, S408, S407, S506, S508, S606, and S608 in the foregoing method embodiments. Optionally, the second IAB node may further include a storage module, configured to store program code and data of the second IAB node.

The processing module of the second IAB node may be a processor or a controller, for example, may be a CPU, a general purpose processor, a DSP, an ASIC, an FPGA or another programmable logic device, a transistor logic device, a hardware component, or any combination thereof. The processor may implement or execute various example logical blocks, modules, and circuits described with reference to content in the embodiments. The processor may alternatively be a combination of processors implementing a computing function, for example, a combination of one or more microprocessors, or a combination of a DSP and a microprocessor. The communications module of the second IAB node may be a transceiver, a transceiver circuit, a communications interface, or the like. The storage module of the second IAB node may be a memory.

When the processing module is the processor, the communications module is the transceiver, and the storage module is the memory, the processor, the transceiver, and the memory may be connected through a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing description about the implementations allows a person of ordinary skill in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above. For a detailed working process of the foregoing systems, apparatuses, and units, refer to a corresponding process in the foregoing method embodiments. Details are not described herein again.

In the several embodiments provided, it should be understood that the system, apparatus, and method may be implemented in other manners. For example, the foregoing apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions in the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the solutions essentially, or the part contributing to the conventional technology, or all or some of the solutions may be implemented in the form of a software product. The computer software product is stored in a storage medium and includes several instructions for instructing a computer device (which may be a personal computer, a server, or a network device) or a processor to perform all or some of the steps of the method according to the embodiments. The foregoing storage medium includes any medium that can store program code, such as a flash memory, a removable hard disk, a read-only memory, a random access memory, a magnetic disk, or a compact disc.

The foregoing descriptions are merely specific implementations of the embodiments, but are not intended as limiting.

What is claimed is:

1. An integrated access and backhaul (IAB) node switching method, comprising:
    sending, from a third IAB node to a source donor node, a measurement report, using an RRC message, that reflects channel quality;
    receiving, by the third IAB node, a node switching command from the source donor node, wherein the source donor node is a control node of the third IAB node, a first node is a source parent node of the third IAB node, the node switching command is based upon a determination of the channel quality by the source donor node based on the measurement report reported by the third IAB node, and the node switching command comprises target transmission time unit configuration information of the third IAB node;
    switching, by the third IAB node, to a second node, and sending, by the third IAB node, first indication information to a child node of the third IAB node, wherein the first indication information indicates the child node to interrupt transmission with the third IAB node.

2. The method according to claim 1, wherein that the first indication information indicates the child node to interrupt transmission with the third IAB node comprises: the first indication information indicates the child node to perform one or a combination of the following operations:
    suspending a physical uplink control channel (PUCCH) resource between the third IAB node and the child node,
    suspending a physical random access channel (PRACH) resource between the third IAB node and the child node,
    stopping an uplink synchronous timer, stopping a timer related to a scheduling request (SR),
    stopping a timer related to a buffer status report (BSR),
    stopping a timer related to radio link control (RLC) retransmission,
    stopping a timer related to RLC data reassembly,
    stopping a timer related to an RLC status report,
    stopping a packet data convergence protocol (PDCP) packet loss timer,
    stopping a PDCP layer reordering timer,
    stopping radio resource management (RRM) measurement between the third IAB node and the child node,
    stopping reading a system broadcast message, or
    stopping data transmission with the third IAB node.

3. The method according to claim 1, further comprising:
    performing, by the third IAB node, one or a more of:
    stopping sending data to the child node, stopping receiving data from the child node, stopping broadcasting a system message, or stopping sending a reference signal.

4. The method according to claim 1, wherein the target transmission time unit configuration information comprises at least one of the following:
    target transmission time unit configuration information of a link between the second node and the third IAB node,
    target transmission time unit configuration information of a link between the third IAB node and the child node of the third IAB node,
    target transmission time unit configuration information of a link between the second node and the third IAB node or
    target transmission time unit configuration information of a link between the third IAB node and the child node of the third IAB node.

5. The method according to claim 4, wherein the switching, by the third IAB node, to the second node comprises:
    initiating, by the third IAB node, random access to the second node, wherein a transmission time unit used by the third IAB node to initiate random access is one or more transmission time units comprised in the target transmission time unit configuration information of the link between the second node and the third IAB node.

6. The method according to claim 1, further comprising:
    sending, by the third IAB node, second indication information to the child node after the third IAB node successfully accesses the second node, wherein the second indication information indicates the child node to resume transmission with the third IAB node.

7. The method according to claim 6, wherein that the second indication information indicates the child node to resume transmission with the third IAB node comprises: the second indication information indicates the child node to perform one or a combination of the following operations:
    resuming the PUCCH resource between the third IAB node and the child node,
    resuming the PRACH resource between the third IAB node and the child node,
    resuming the uplink synchronous timer,
    resuming the timer related to an SR,
    resuming the timer related to a BSR,
    resuming the timer related to RLC retransmission,
    resuming the timer related to RLC data reassembly,
    resuming the timer related to an RLC status report,
    resuming the PDCP packet loss timer,
    resuming the PDCP layer reordering timer,
    resuming the RRM measurement between the third IAB node and the child node,
    resuming reading the system broadcast message, and
    resuming the data transmission with the third IAB node.

8. An apparatus, which is a third integrated access and backhaul (IAB) node in an IAB system, comprising:
    at least one processor; and
    at least one memory storing instructions, wherein the instructions are executed by the at least one processor to cause the apparatus to:
    sending, from the third IAB node to a source donor node, a measurement report, using an RRC message, that reflects channel quality;
    receive a node switching command from the source donor node, wherein the source donor node is a control node of the third IAB node, a first node is a source parent node of the third IAB node, and the node switching command is based upon a determination of the channel quality by the source donor node based on the measurement report reported by the third IAB node, and the node switching command comprises target transmission time unit configuration information of the third IAB node;

switch to a second node; and send first indication information to a child node of the third IAB node, wherein the child node is configured to interrupt transmission with the third IAB node.

9. The apparatus according to claim 8, wherein that the first indication information indicates the child node to interrupt transmission with the third IAB node comprises: the first indication information indicates the child node to perform one or a combination of the following operations:

suspending a physical uplink control channel (PUCCH) resource between the third IAB node and the child node, suspending a physical random access channel (PRACH) resource between the third IAB node and the child node, stopping an uplink synchronous timer, stopping a timer related to a scheduling request (SR), stopping a timer related to a buffer status report (BSR), stopping a timer related to radio link control (RLC) retransmission, stopping a timer related to RLC data reassembly, stopping a timer related to an RLC status report, stopping a packet data convergence protocol (PDCP) packet loss timer, stopping a PDCP layer reordering timer, stopping radio resource management (RRM) measurement between the third IAB node and the child node, stopping reading a system broadcast message, or stopping data transmission with the third IAB node.

10. The apparatus according to claim 8, wherein the apparatus is further caused to: perform one or a combination of the following operations:

stopping sending data to the child node, stopping receiving data from the child node, stopping broadcasting a system message, or stopping sending a reference signal.

11. The apparatus according to claim 8, wherein the target transmission time unit configuration information comprises at least one of the following:

target transmission time unit configuration information of a link between the second node and the third IAB node, target transmission time unit configuration information of a link between the third IAB node and the child node of the third IAB node, target transmission time unit configuration information of a link between the second node and the third IAB node or target transmission time unit configuration information of a link between the third IAB node and the child node of the third IAB node.

12. The apparatus according to claim 11, wherein the switch, by the third IAB node, to the second node comprises:

initiating, by the third IAB node, random access to the second node, wherein a transmission time unit used by the third IAB node to initiate random access is one or more transmission time units comprised in the target transmission time unit configuration information of the link between the second node and the third IAB node.

13. The apparatus according to claim 8, wherein the apparatus is further caused to:

send second indication information to the child node after the third IAB node successfully accesses the second node, wherein the second indication information indicates the child node to resume transmission with the third IAB node.

14. The apparatus according to claim 13, wherein that the second indication information indicates the child node to resume transmission with the third IAB node comprises:

the second indication information indicates the child node to perform one or a combination of the following operations:

resuming the PUCCH resource between the third IAB node and the child node, resuming the PRACH resource between the third IAB node and the child node, resuming the uplink synchronous timer, resuming the timer related to an SR, resuming the timer related to a BSR, resuming the timer related to RLC retransmission, resuming the timer related to RLC data reassembly, resuming the timer related to an RLC status report, resuming the PDCP packet loss timer, resuming the PDCP layer reordering timer, resuming the RRM measurement between the third IAB node and the child node, resuming reading the system broadcast message, or resuming the data transmission with the third IAB node.

* * * * *